(12) United States Patent
Culpepper et al.

(10) Patent No.: US 9,128,199 B2
(45) Date of Patent: Sep. 8, 2015

(54) SYSTEMS FOR ACQUIRING AND PROCESSING SEISMIC DATA

(75) Inventors: Steve Culpepper, Midland, TX (US);
Donnie Hicks, Lubbock, TX (US)

(73) Assignee: Safe Seismic, LLC, Lubbock, TX (US)

( * ) Notice: Subject to any disclaimer, the term of this patent is extended or adjusted under 35 U.S.C. 154(b) by 653 days.

(21) Appl. No.: 13/549,974

(22) Filed: Jul. 16, 2012

(65) Prior Publication Data

US 2014/0016437 A1    Jan. 16, 2014

(51) Int. Cl.
*G01V 1/20* (2006.01)
*G01V 1/00* (2006.01)

(52) U.S. Cl.
CPC *G01V 1/003* (2013.01); *G01V 1/20* (2013.01); G01V 2210/16 (2013.01)

(58) Field of Classification Search
CPC .............. G01V 1/003; G01V 2210/16; G01V 2210/50; G01V 1/20

USPC ...................................................... 367/56, 58
See application file for complete search history.

(56) References Cited

U.S. PATENT DOCUMENTS

| | | | |
|---|---|---|---|
| 3,867,713 A | 2/1975 | Tegland et al. |
| 4,467,460 A | 8/1984 | Johnson |
| 4,926,393 A | 5/1990 | McClellan et al. |
| 5,029,145 A | 7/1991 | Marsden et al. |
| 5,402,391 A | 3/1995 | Cordsen |
| 6,084,825 A | 7/2000 | Poggiagliolmi |
| 7,768,872 B2 | 8/2010 | Kappius et al. |
| 7,859,945 B2 | 12/2010 | Sallas et al. |

*Primary Examiner* — Daniel L Murphy
(74) *Attorney, Agent, or Firm* — Klemchuk LLP; Kirby B. Drake

(57) ABSTRACT

Systems and methods may be provided for setting up a geophysical seismic information-gathering grid utilizing an alternating source pattern as well as an alternating receiver pattern using base patterns including but not limited to "I+H" or "H+I" and "box plus." Use of such base patterns may allow seismic data to be collected and processed using a reduced number of sources and receivers to provide a seismic imaging plot having increased and noticeably improved resolution than is presently available.

20 Claims, 34 Drawing Sheets

FIG. 9A $$
\begin{array}{cccc}
S & S & S & S \\
 & \phantom{S}R & & \\
 & R & & \\
 & R & & \\
 & R & & \\
\end{array}
$$

SYSTEMS FOR ACQUIRING AND PROCESSING SEISMIC DATA

FIELD OF THE DISCLOSURE

The present disclosure generally relates to seismic data collection, and more particularly to systems for acquisition and processing of seismic data.

BACKGROUND

In geophysical exploration, co-linear arrays of sources and receivers may be positioned to form a grid or brick pattern. Each source may then be activated to create a seismic disturbance, such as an explosive charge, that may create a wave that penetrates down into the earth. The wave contacts a sub-surface acoustic impedance boundary or layer and is reflected back to the surface to be detected by one or more receivers (i.e., geophones and microphones). Instrumentation then converts the reflected waves to signals that are recorded as data for seismic processing and interpretation, such as to evaluate where to drill. Noise may mask actual sub-surface features identified by the reflected wave signals. Increasing the fold may address noise issues by improving the signal-to-noise ratio. Increasing the number of sources and receivers used in the grid or brick pattern may increase the fold. However, as the number of sources and receivers increases, seismic data collection may become quite expensive in terms of resources needed. Further, there may be losses in resolution on seismic imaging plots as the number of sources and receivers used increases.

SUMMARY

Embodiments of the present disclosure may provide a seismic information gathering system comprising an alternating source pattern, wherein a plurality of source locations may be set parallel to each other separated by one unit to create two straight-line segments and an alternating receiver pattern, wherein a plurality of receiver locations may be set parallel to each other and perpendicular to the plurality of source locations separated by one unit, wherein the alternating source pattern and the alternating receiver pattern may form a base pattern including at least an "H," an "I" and a "+." The base pattern may be an "H+I" or "I+H" pattern. The base pattern may be rotated at an angle between 0 and 360 degrees with reference to the earth. The base pattern may be repeated at a predefined interval. The system may be in a closed or open configuration. The alternating source pattern may be positioned at an angle relative to the alternating receiver pattern.

Other embodiments of the present disclosure may provide a seismic information gathering system that may comprise an alternating receiver pattern, wherein a plurality of receiver locations may be set parallel to each other separated by one unit to create two straight-line segments and an alternating source pattern, wherein a plurality of source locations may be set parallel to each other and perpendicular to the plurality of receiver locations separated by one unit, wherein the alternating source pattern and the alternating receiver pattern may form a base pattern including at least an "H," an "I" and a "+." The base pattern may be an "H+I" or "I+H" pattern. The base pattern may be rotated at an angle between 0 and 360 degrees with reference to the earth. The system may be in a closed configuration. The alternating source pattern may be positioned at an angle relative to the alternating receiver pattern.

Further embodiments of the present disclosure may provide a seismic information gathering system that may include an alternating receiver pattern, wherein a plurality of receiver locations may be set parallel to each other separated by one unit to create two straight-line segments, and an alternating source pattern, wherein a plurality of source locations may be set parallel to each other and perpendicular to the plurality of receiver locations separated by one unit, wherein the alternating source pattern and the alternating receiver pattern may form a base pattern including a "box" and a "+." The base pattern may be rotated at an angle between 0 and 360 degrees with reference to the earth. The alternating source pattern may be positioned at an angle relative to the alternating receiver pattern. The base pattern also may be repeated at a predefined interval. The system may be in a closed configuration. In some embodiments of the present disclosure, the alternating receiver pattern and the alternating source pattern may be inverted. The source pattern and the receiver pattern may be set at any angle relative to one another.

BRIEF DESCRIPTION OF THE DRAWINGS

For a more complete understanding of this disclosure, reference is now made to the following description, taken in conjunction with the accompanying drawings, in which:

Figure 1:
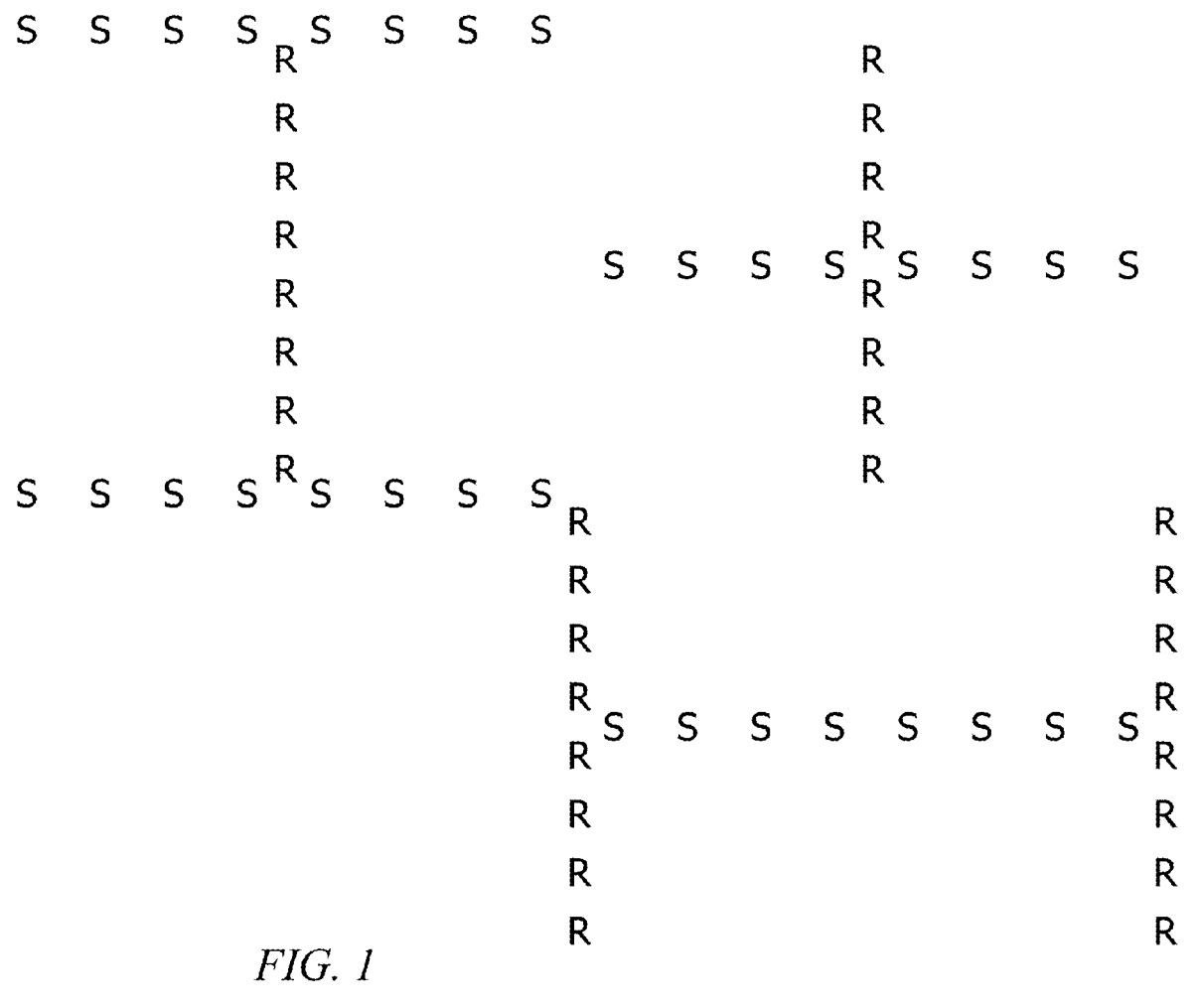

FIG. 1 depicts an "I+H" source and receiver configuration according to an embodiment of the present disclosure;

FIG. 2 depicts an "H+I" source and receiver configuration according to an embodiment of the present disclosure;

FIG. 4A depicts an "I+H" source and receiver inverse closed propagation configuration according to an embodiment of the present disclosure;

FIG. 5 depicts a "square wave" source and receiver configuration according to an embodiment of the present disclosure;

FIG. 5A depicts a "square wave" source and receiver propagation configuration according to an embodiment of the present disclosure;

FIG. 6 depicts a "symmetric square" source and receiver configuration according to an embodiment of the present disclosure;

FIG. 6A depicts a "symmetric square" source and receiver propagation configuration according to an embodiment of the present disclosure;

FIG. 7 depicts a "box plus" source and receiver configuration according to an embodiment of the present disclosure;

FIG. 7A depicts a "box plus" source and receiver propagation configuration according to an embodiment of the present disclosure;

FIG. 8 depicts a "goal tee" source and receiver configuration according to an embodiment of the present disclosure;

FIG. 8A depicts a "goal tee" source and receiver propagation configuration according to an embodiment of the present disclosure;

FIG. 9 depicts a "step" source and receiver configuration according to an embodiment of the present disclosure;

FIG. 9A depicts a "step" source and receiver propagation configuration according to an embodiment of the present disclosure;

FIG. 10 depicts a "Texas tee" source and receiver configuration according to an embodiment of the present disclosure;

FIG. 10A depicts a "Texas tee" source and receiver propagation configuration according to an embodiment of the present disclosure;

FIG. 11 depicts an "offset squares" source and receiver configuration according to an embodiment of the present disclosure;

FIG. 11A depicts an "offset squares" source and receiver propagation configuration according to an embodiment of the present disclosure;

FIG. 12 depicts an "offset cross" source and receiver configuration according to an embodiment of the present disclosure;

FIG. 12A depicts an "offset cross" source and receiver propagation configuration according to an embodiment of the present disclosure;

FIG. 13 depicts an "offset x" source and receiver configuration according to an embodiment of the present disclosure;

FIG. 13A depicts an "offset x" source and receiver propagation configuration according to an embodiment of the present disclosure;

DETAILED DESCRIPTION

Figure 1A:
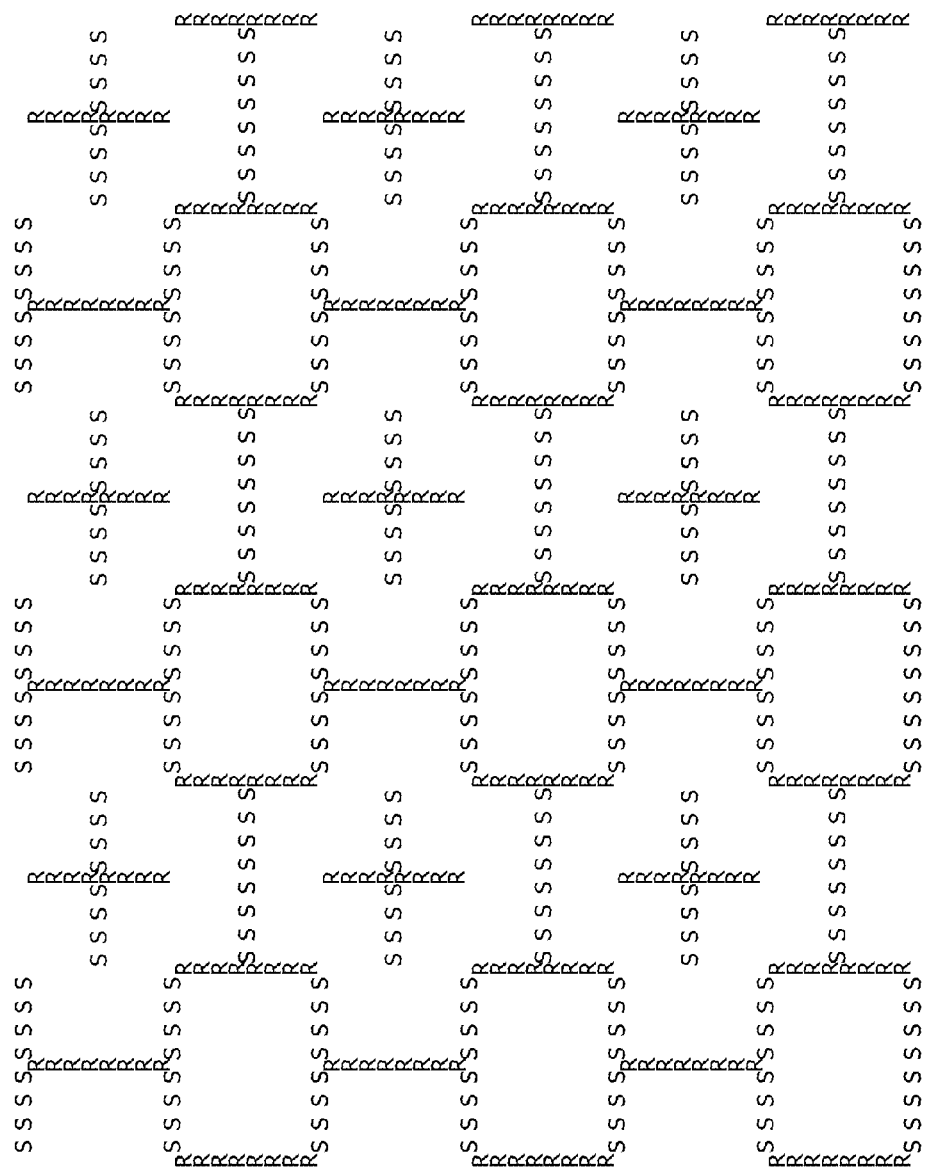
FIG. 1A depicts an "I+H" source and receiver closed propagation configuration according to an embodiment of the present disclosure.

Embodiments of the present disclosure are directed to systems for setting up a geophysical seismic information-gathering grid utilizing an alternating source pattern as well as an alternating receiver pattern in an "I+H," "H+I" or "box plus" base pattern. Other patterns including "square wave," "symmetric square," "goal tee," "step," "Texas tee," "offset squares," "offset cross" and "offset x" may be used in place of "I+H," "H+I" or "box plus" without departing from the present disclosure. Use of any of these base patterns may allow seismic data to be collected and processed using reduced numbers of sources and receivers to provide a seismic imaging plot having increased and noticeably improved resolution than is presently available. Use of any of these patterns may reduce the number of sources and receivers needed to gain acceptable results. The reduction in receivers and sources may reduce costs as well as reduce environmental impact. The reduction in receivers and sources also may reduce employee exposure to job injuries insofar as less time may be spent on a given seismic gathering project.

In embodiments of the present disclosure, a source pattern may be formed such that a number of source locations may be set parallel to each other separated by one unit. Accordingly, two straight-line parallel source segments may be formed, which may be referred to as a set of sources. After providing a set of sources, additional source sets may be formed by moving along the original straight-line parallel segments at one-unit intervals. Similarly, source sets may be formed by moving up or down at one-half-unit spacing intervals. It should be appreciated that other sub-units, or any variable thereof, may define additional source sets without departing from the present disclosure.

A receiver set may originate along the set of sources approximately one-half unit in and perpendicular to the source pattern in direction according to some embodiments of the present disclosure. However, it should be appreciated that a receiver set also may originate along any sub-unit of the set of sources at any angle or variation thereof without departing from the present disclosure.

A receiver pattern may be laid out such that a number of receiver locations may be set parallel to each other separated by one unit, thereby creating two straight-line segments that may be referred to as a set of receivers. Moving along the original straight-line source segments at one-unit intervals may create additional receiver sets. It also should be appreciated that receiver sets may be formed by moving up or down at one-half-unit spacing intervals without departing from the present disclosure. It also should be appreciated that additional receiver sets may be defined by any sub-unit, as well as any variable thereof, without departing from the present disclosure.

FIG. 1 depicts an I plus H source and receiver configuration according to an embodiment of the present disclosure. The configuration depicted in FIG. 1 may be referred to as an "I+H" base pattern according to embodiments of the present disclosure. The configuration may be referred to as "I plus H" because the sources (each designated with the letter "S") may be positioned to form the horizontal portions of the letter "I" as well as the "+" sign and the letter "H" as depicted in FIG. 1. Conversely, the receivers (each designated with the letter "R") may be positioned to form the vertical portions of the letter "I" as well as the "+" sign and the letter "H" comprising the "I+H" configuration as depicted in FIG. 1.

Sets of eight sources and eight receivers may be used to form the different portions of an "I+H" pattern as depicted in FIG. 1; however, it should be appreciated that as few as two sources and two receivers in a set or as many as several hundred sources and receivers in a set may be used to form base patterns, such as "I+H" or one of the other patterns later described according to embodiments of the present disclosure. While the "I+H" configuration of FIG. 1 may be depicted at 0 degrees rotation relative to the earth, it should be appreciated that the configuration pattern may be rotated at an angle between 0 and 360 degrees with reference to the earth without departing from the present disclosure. Similarly, other patterns described in embodiments of the present disclosure may be rotated in a similar manner without departing from the present disclosure.

Figure 1B:
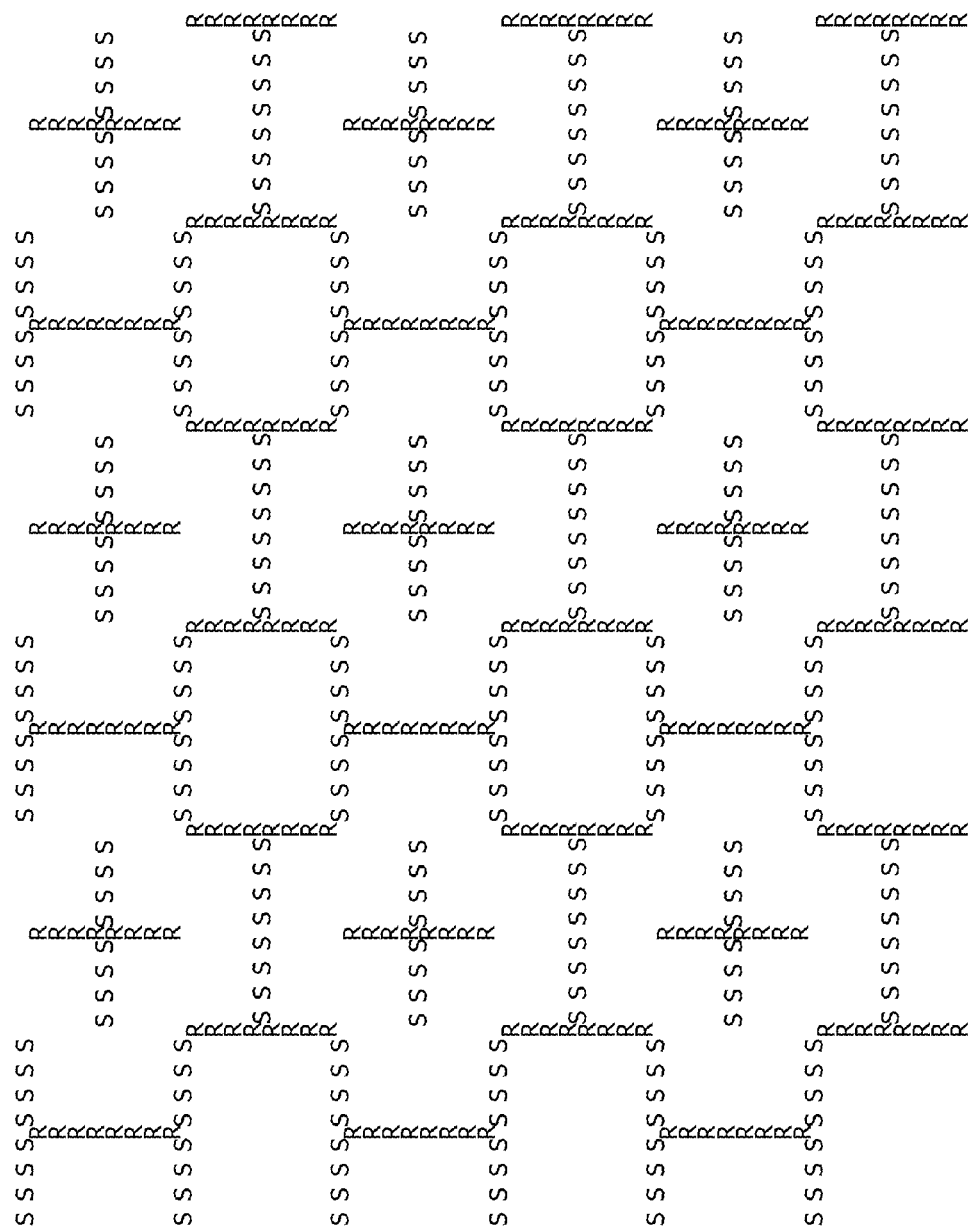
FIG. 1B depicts an "I+H" source and receiver propagation configuration according to an embodiment of the present disclosure.

It should be appreciated that this base pattern depicted in FIG. 1 may be repeated at a predefined interval that may be proportional to the original unit and sub-unit intervals until desired coverage may be achieved. FIG. 1A depicts an "I+H" source and receiver closed propagation configuration according to an embodiment of the present disclosure. This pattern may be referred to as a closed configuration insofar as another group of sources and receivers may be added along one side and one top or bottom edge to close out the pattern. FIG. 1B depicts an "I+H" source and receiver propagation configuration according to an embodiment of the present disclosure.

It should be appreciated that regardless what type of pattern or propagation (closed or open) may be employed, the spacing of each receiver set and source set may be relatively equal throughout the propagation in order to create a homogenous pattern to allow seismic data collection that may generate greater fold and better azimuth distribution. Further, use of configurations for seismic data collection according to embodiments of the present disclosure may provide for removal of acquisition layout from the fold plots, thereby leading to cost reduction, time reduction, as well as safety exposure reduction.

Figure 2:
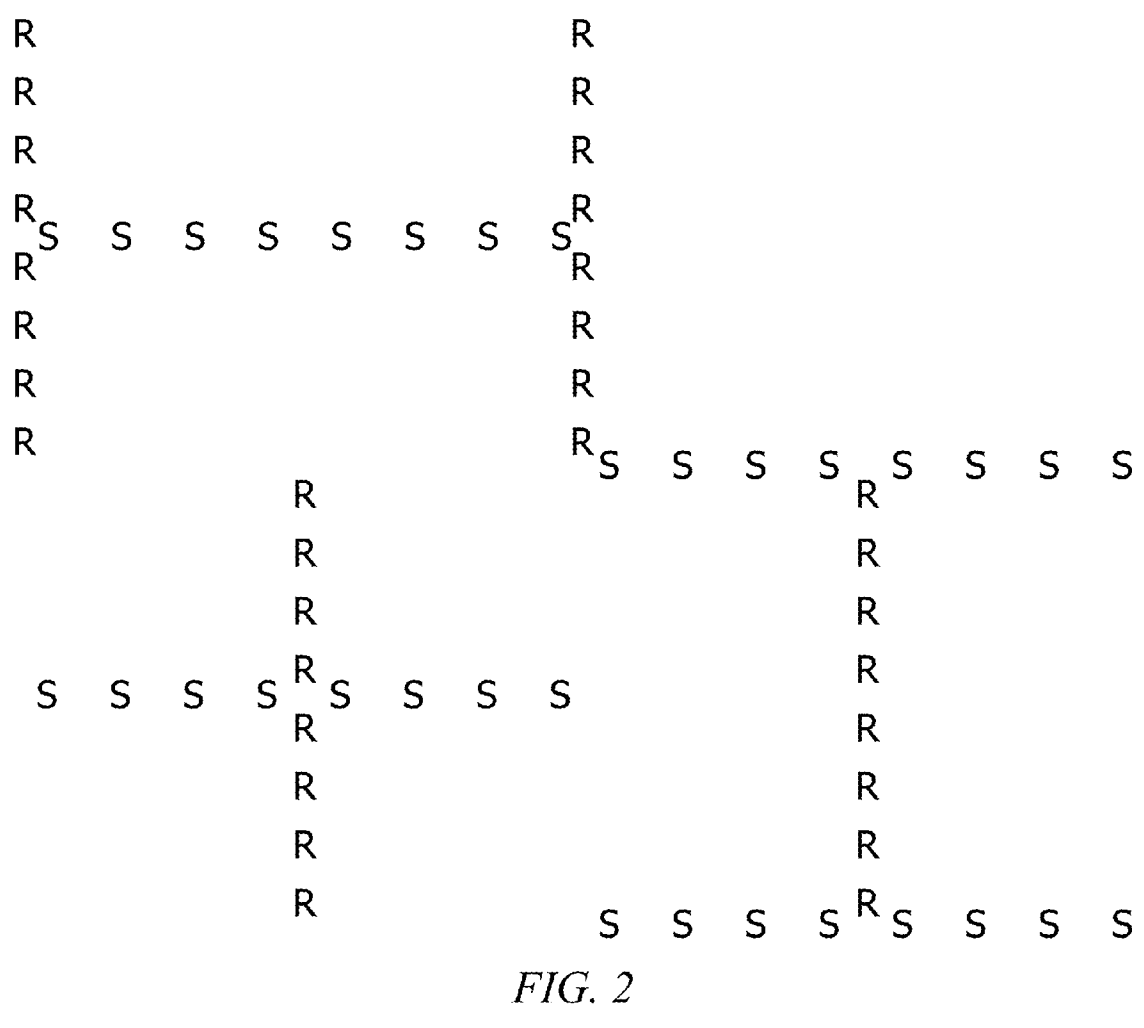

FIG. 2 depicts an H plus I source and receiver configuration according to an embodiment of the present disclosure. The configuration depicted in FIG. 2 may be referred to as an "H+I" base pattern according to embodiments of the present disclosure. The configuration may be referred to as "H plus I" because the sources (each designated with the letter "S") may be positioned to form the horizontal portions of the letter "I" as well as the "+" sign and the letter "H" as depicted in FIG. 2. Conversely, the receivers (each designated with the letter "R") may be positioned to form the vertical portions of the letter "I" as well as the "+" sign and the letter "H" comprising the "H+I" configuration as depicted in FIG. 2. However, in contrast to FIG. 1, the "H" portion of the pattern precedes the "I" portion, thereby forming an inverse of the pattern depicted in FIG. 1.

Figure 2A:
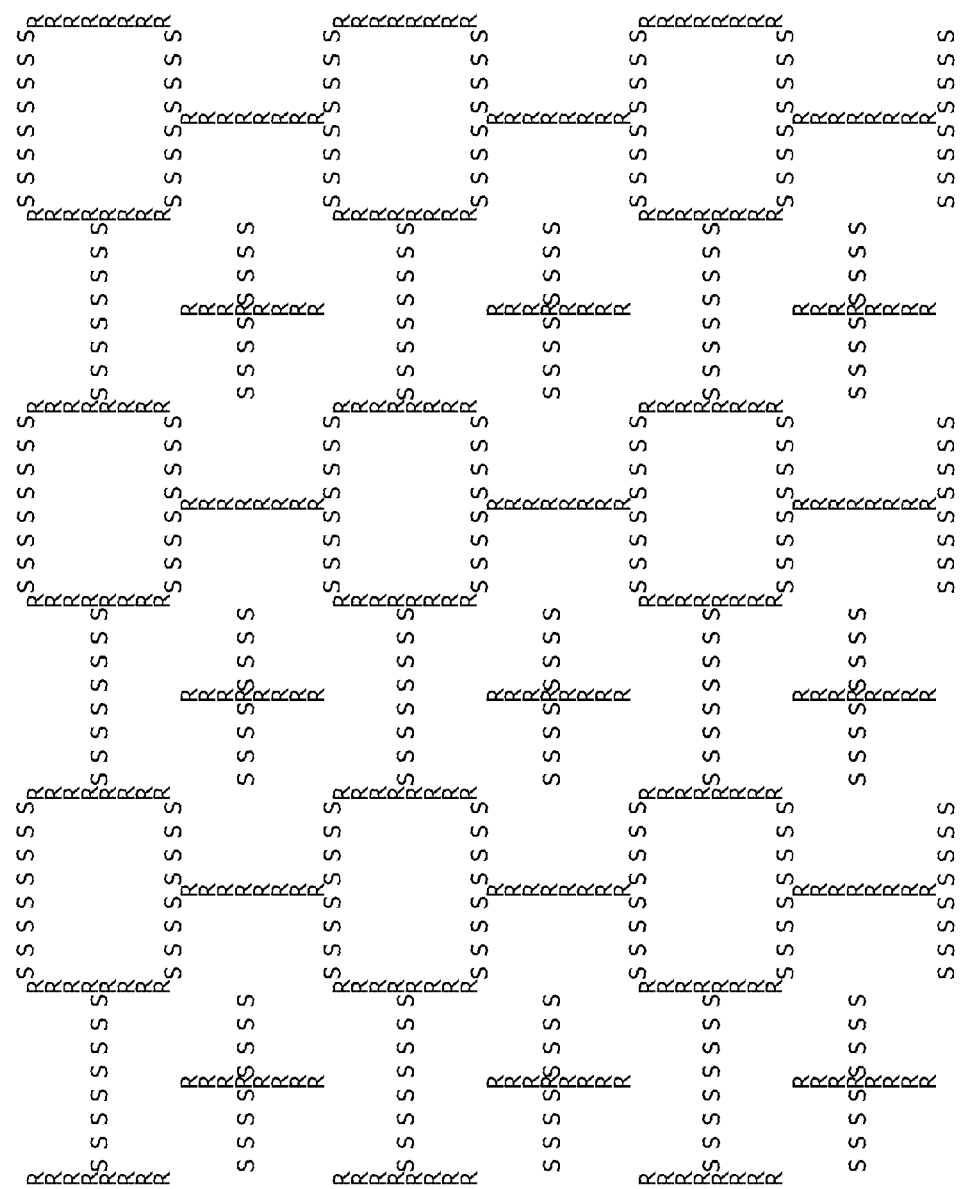
FIG. 2A depicts an "H+I" source and receiver closed propagation configuration according to an embodiment of the present disclosure.
Figure 2B:
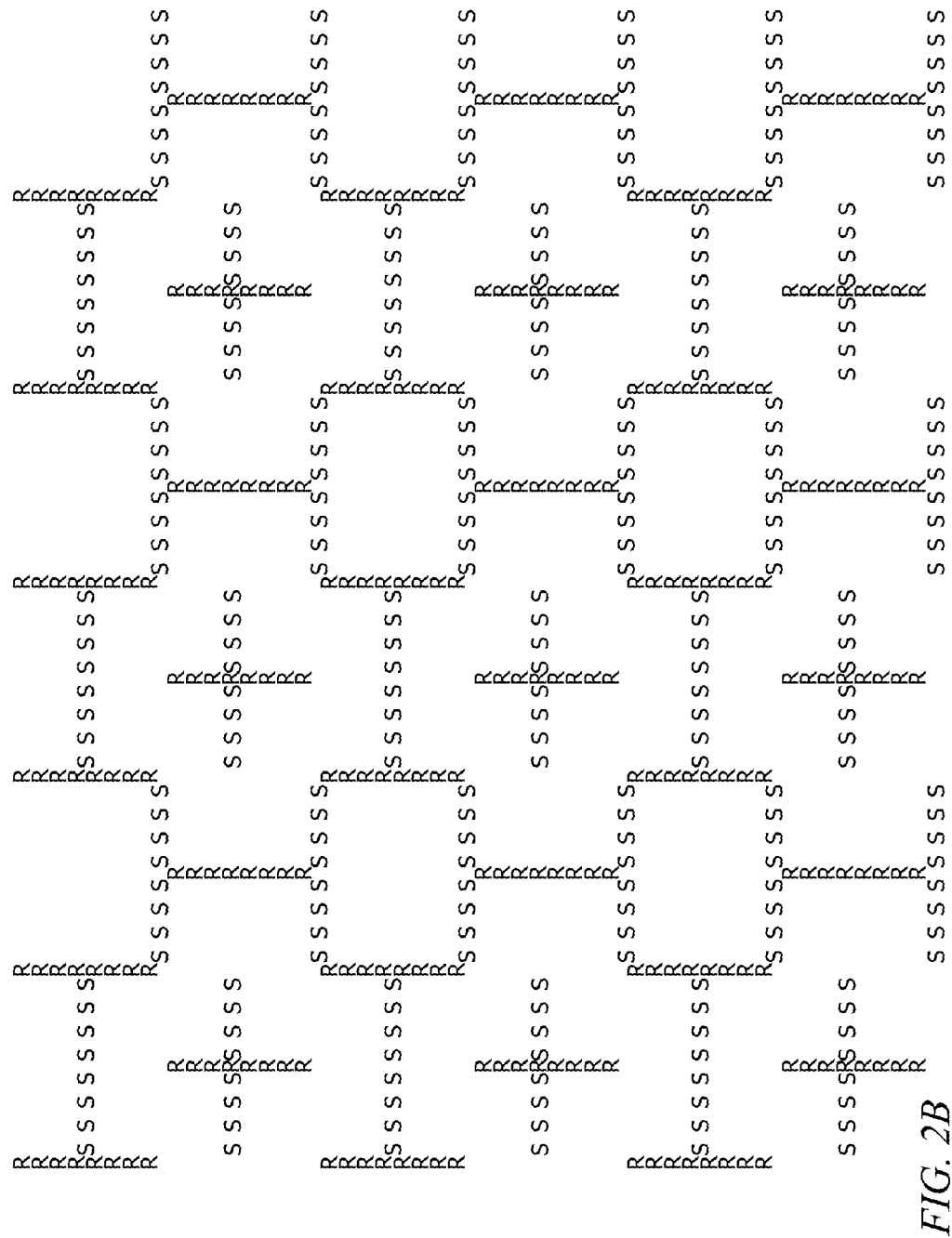
FIG. 2B depicts an "H+I" source and receiver propagation configuration according to an embodiment of the present disclosure.

As with the pattern depicted in FIG. 1, it should be appreciated that this base pattern depicted in FIG. 2 may be repeated at a predefined interval that may be proportional to the original unit and sub-unit intervals until desired coverage may be achieved. FIG. 2A depicts an "H+I" source and receiver closed propagation configuration according to an embodiment of the present disclosure. FIG. 2B depicts an "H+I" source and receiver propagation configuration according to an embodiment of the present disclosure.

Figure 3:
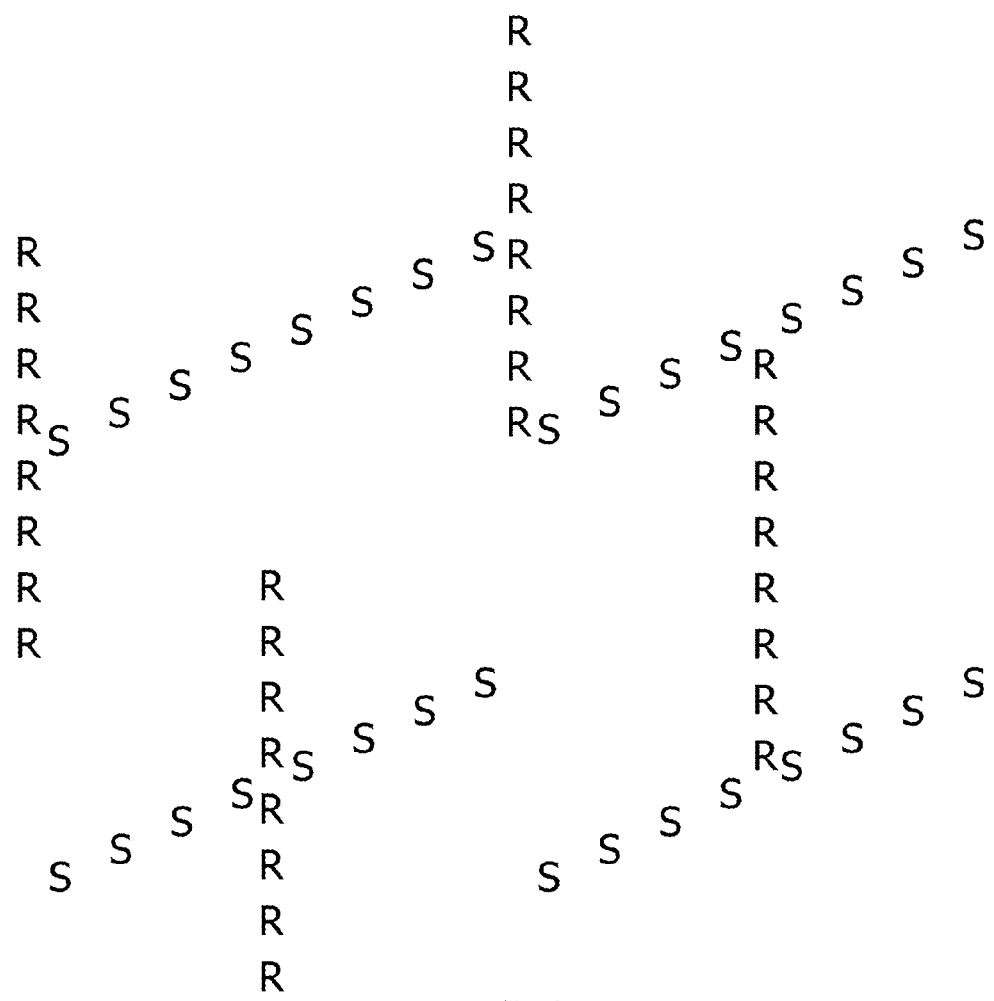
FIG. 3 depicts an "H+I" source and receiver angled configuration according to an embodiment of the present disclosure.

FIG. 3 depicts an H plus I source and receiver angled configuration according to an embodiment of the present disclosure. Positioning receivers and sources at different angles may provide for more optimal angles for collection of seismic data over different topography or land configurations. The pattern depicted in FIG. 3 is similar to that depicted in FIG. 2; however, this pattern may position the receivers and sources at an angle with respect to one another while still providing a reduction in noise when seismic data may be collected. While FIG. 3 depicts the H plus I pattern in an angled configuration, it should be appreciated that patterns other than the H plus I pattern may be formed in an angular configuration without departing from the present disclosure. It also should be appreciated that the angled pattern configurations may be rotated with reference to the earth without departing from the present disclosure. Accordingly, the angle of positioning between receivers and sources may be modified as well as the angle of rotation with reference to the earth according to embodiments of the present disclosure.

Figure 3A:
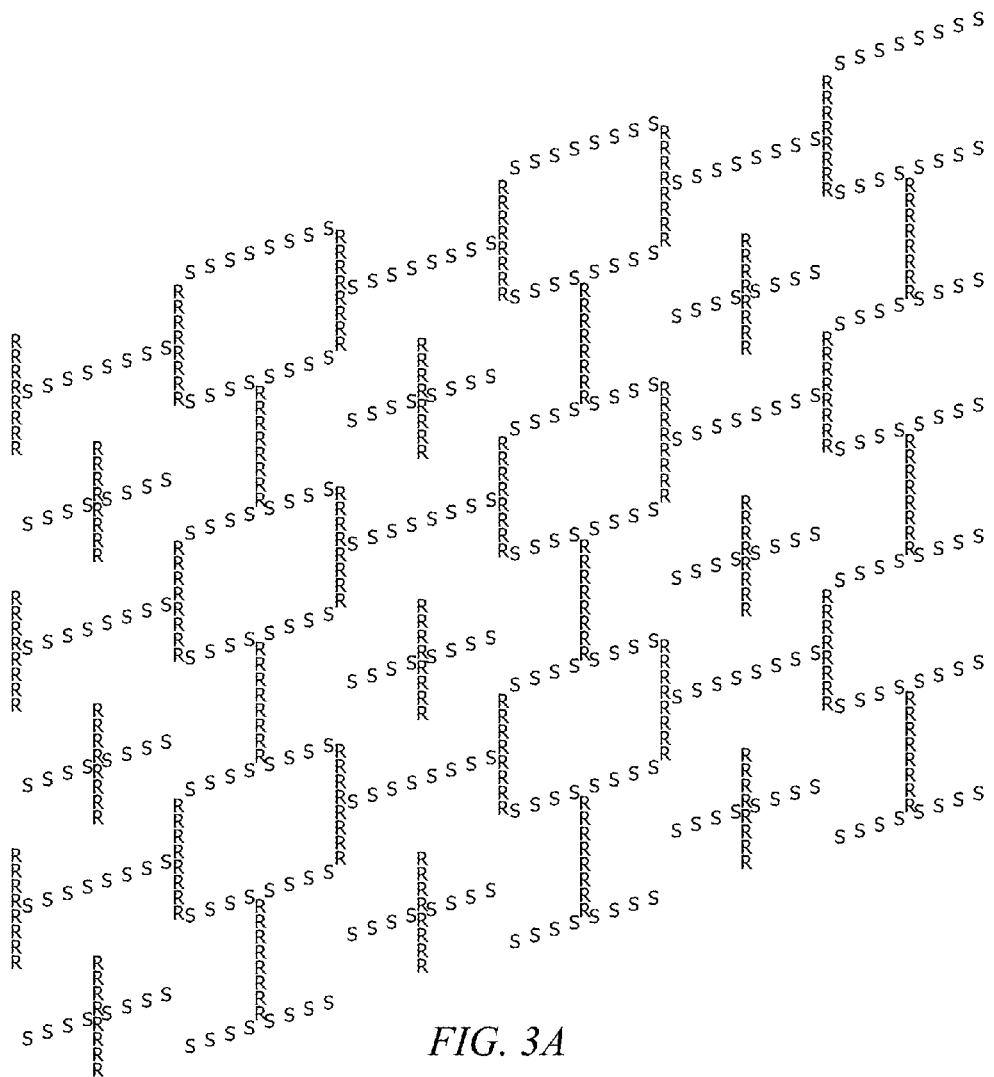
FIG. 3A depicts an "H+I" source and receiver closed propagation angled configuration according to an embodiment of the present disclosure.
Figure 3B:
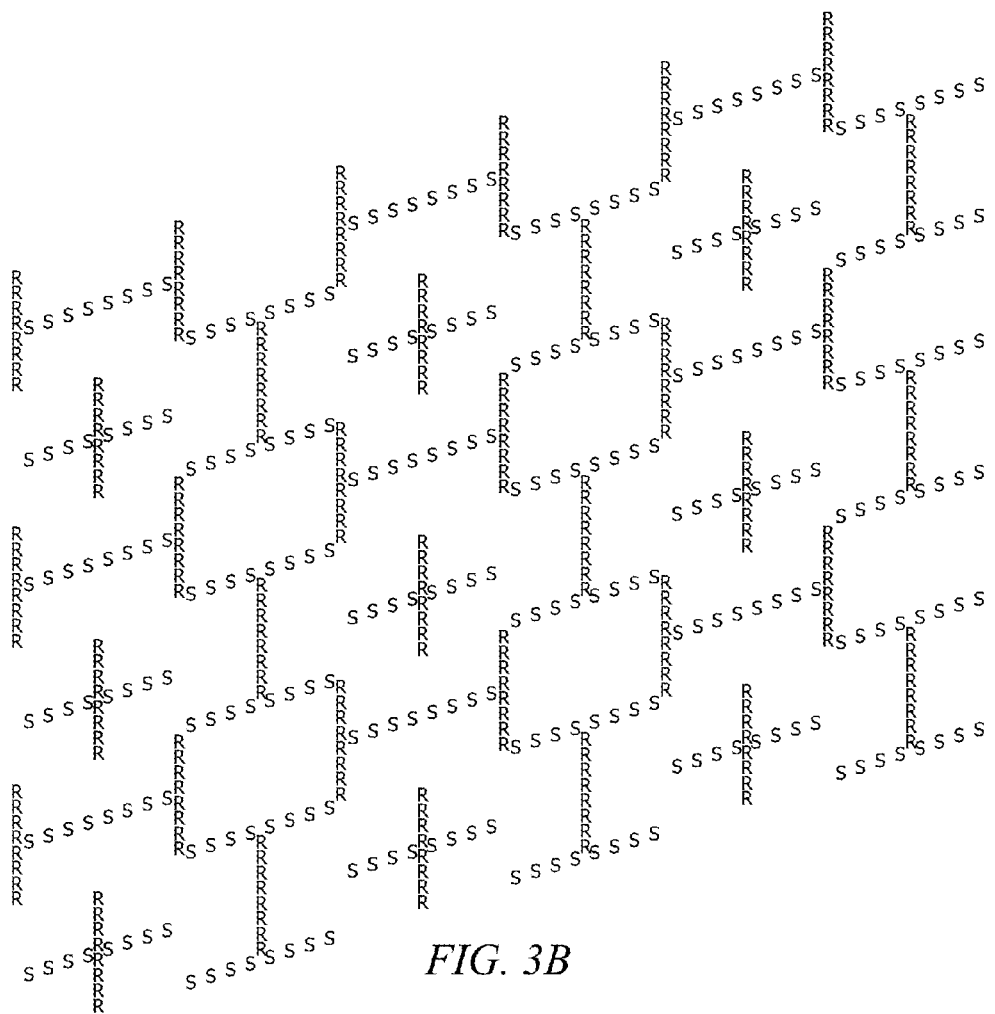
FIG. 3B depicts an "H+I" source and receiver propagation angled configuration according to an embodiment of the present disclosure.

As with the patterns depicted in FIGS. 1 and 2, it should be appreciated that this angled base pattern depicted in FIG. 3 may be repeated at a predefined interval that may be proportional to the original unit and sub-unit intervals until desired coverage may be achieved. FIG. 3A depicts an H plus I source and receiver closed propagation angled configuration according to an embodiment of the present disclosure. Similarly, FIG. 3B depicts an H plus I source and receiver propagation angled configuration according to an embodiment of the present disclosure. While the angle of positioning with respect to the sources and receivers is depicted at a specified acute angle in FIGS. 3, 3A and 3B, it should be appreciated that other angles may be used without departing from the present disclosure.

Figure 4:
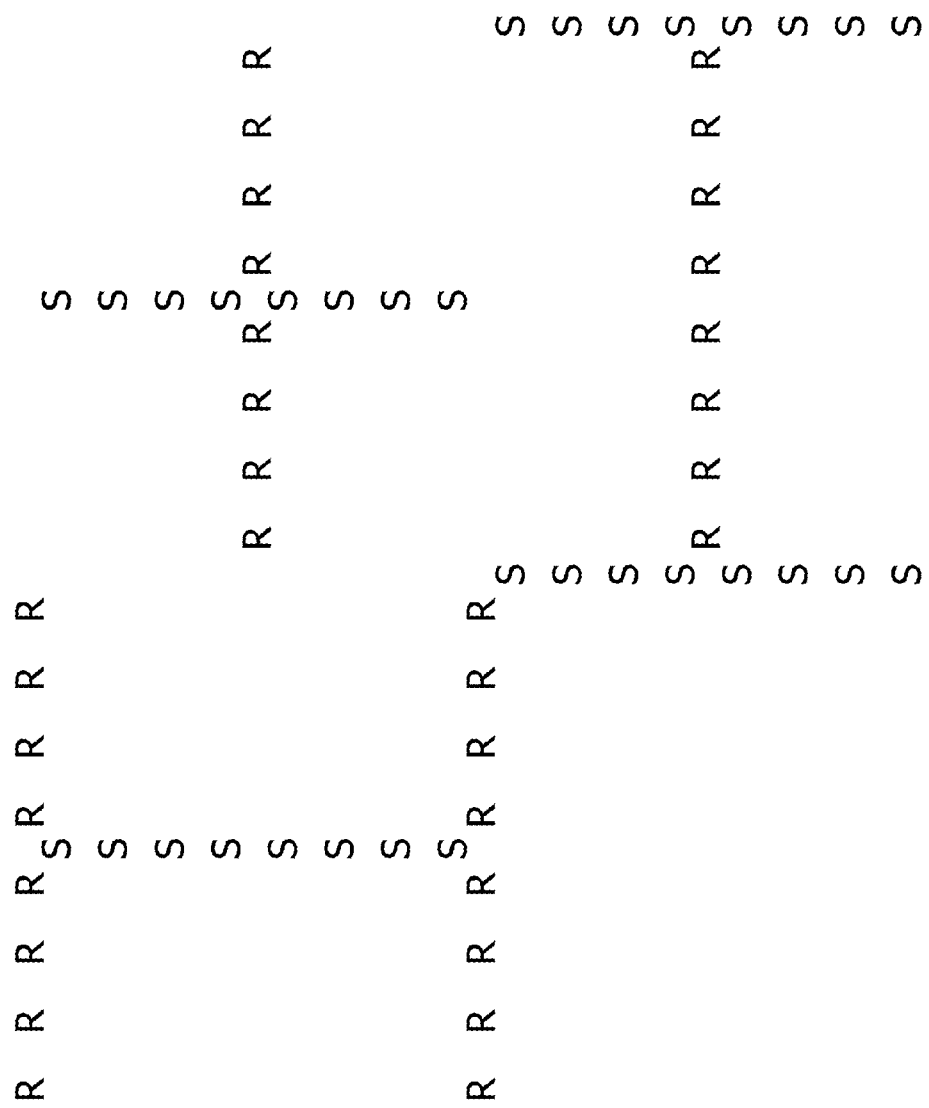
FIG. 4 depicts an "I+H" source and receiver inverse configuration according to an embodiment of the present disclosure.

FIG. 4 depicts an I plus H source and receiver inverse configuration according to an embodiment of the present disclosure. It should be appreciated that FIG. 4 depicts a pattern similar to that shown in FIG. 1; however, in this embodiment of the present disclosure, the sources (each designated with the letter "S") may be positioned to form the vertical portions of the letter "I" as well as the "+" sign and the letter "H" as depicted in FIG. 4. Conversely, the receivers (each designated with the letter "R") may be positioned to form the horizontal portions of the letter "I" as well as the "+" sign and the letter "H" comprising the "I+H" configuration as depicted in FIG. 4. Accordingly, the sources as depicted in FIG. 1 have been replaced with receivers in FIG. 4 and vice versa.

Figure 4A:
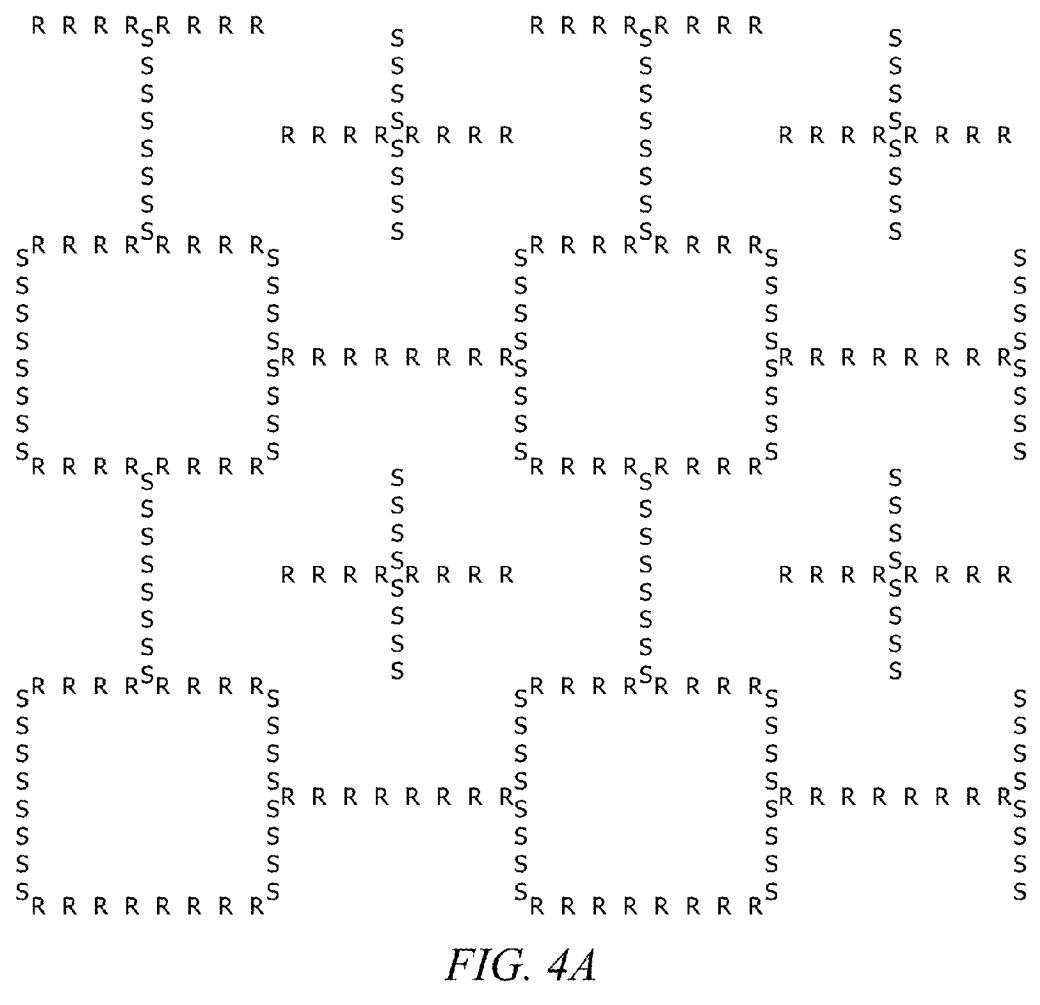
Figure 4B:
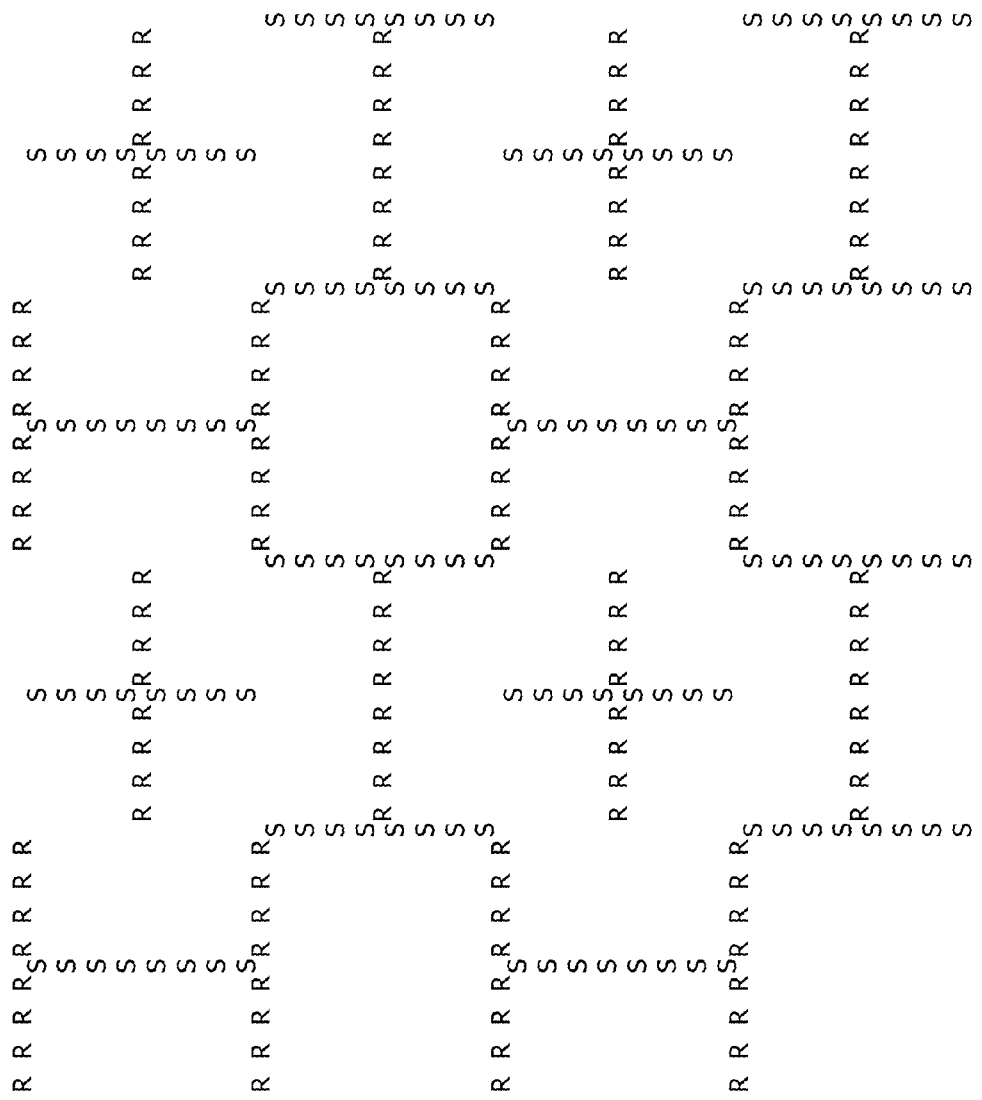
FIG. 4B depicts an "I+H" source and receiver inverse propagation configuration according to an embodiment of the present disclosure.

FIG. 4A depicts an I plus H source and receiver inverse closed propagation configuration according to an embodiment of the present disclosure. FIG. 4B depicts an I plus H source and receiver inverse propagation configuration according to an embodiment of the present disclosure.

Figures 5, 5A:
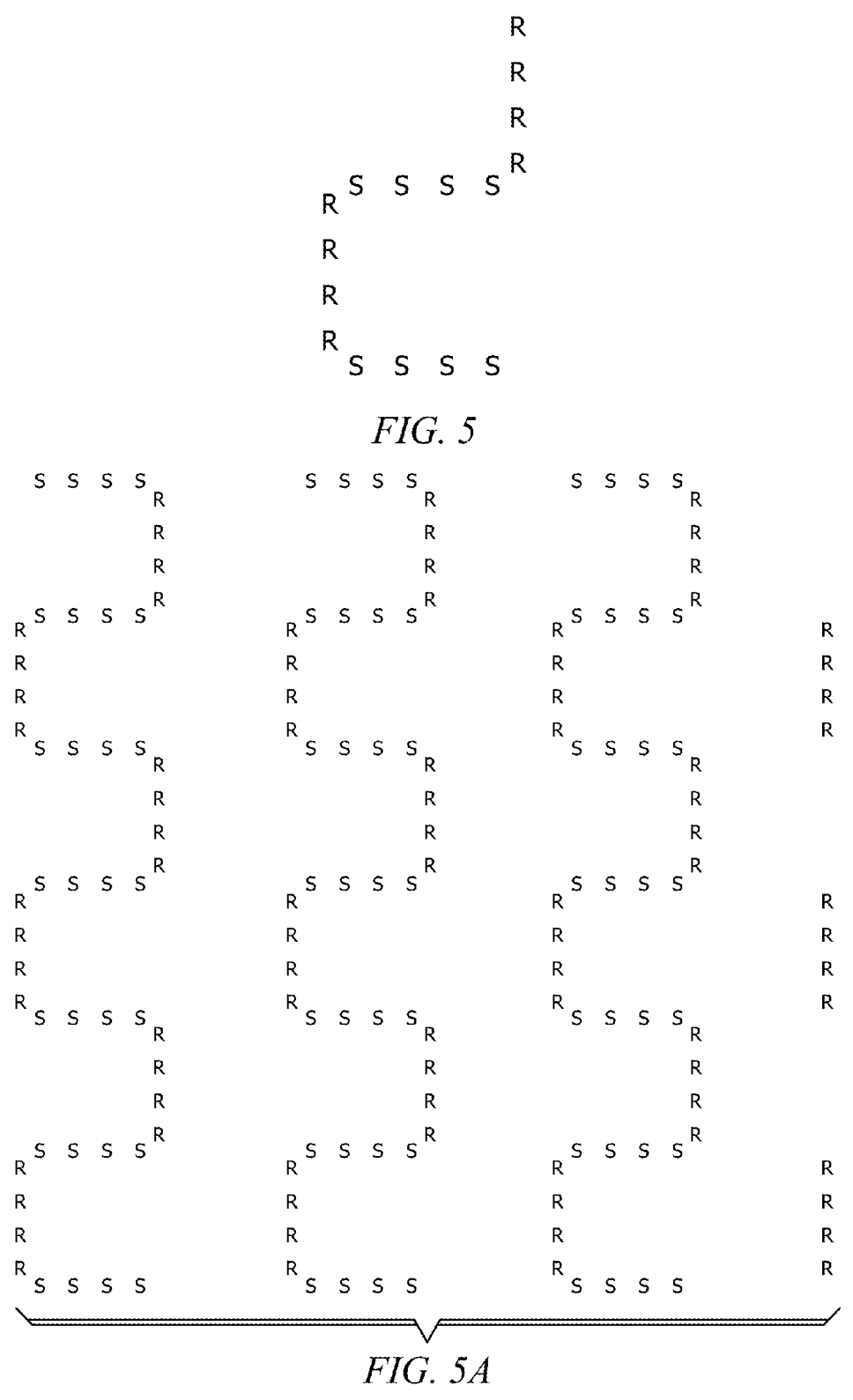
Figure 6:
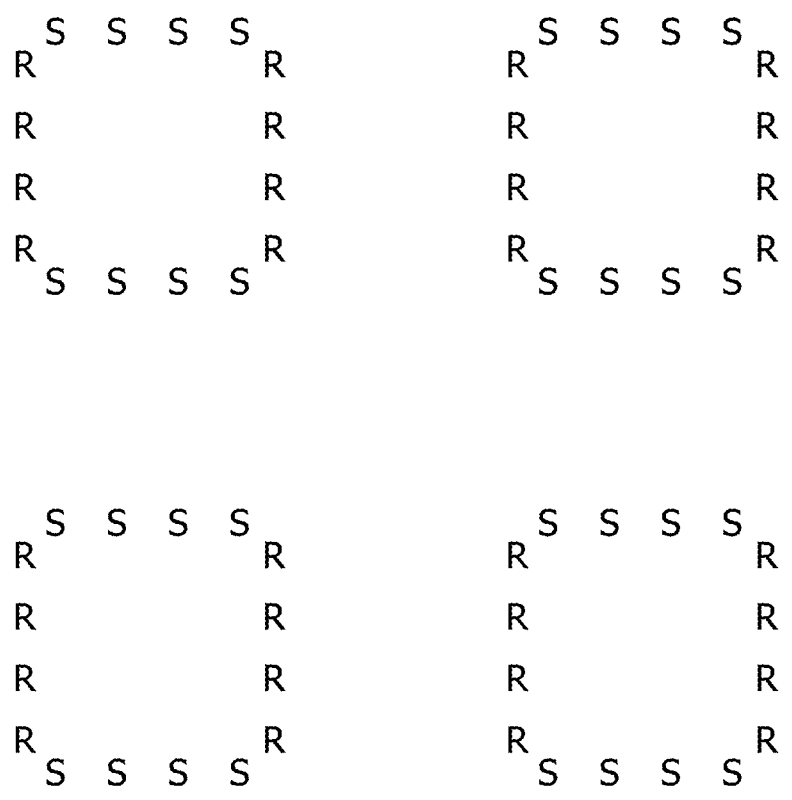
Figure 6A:
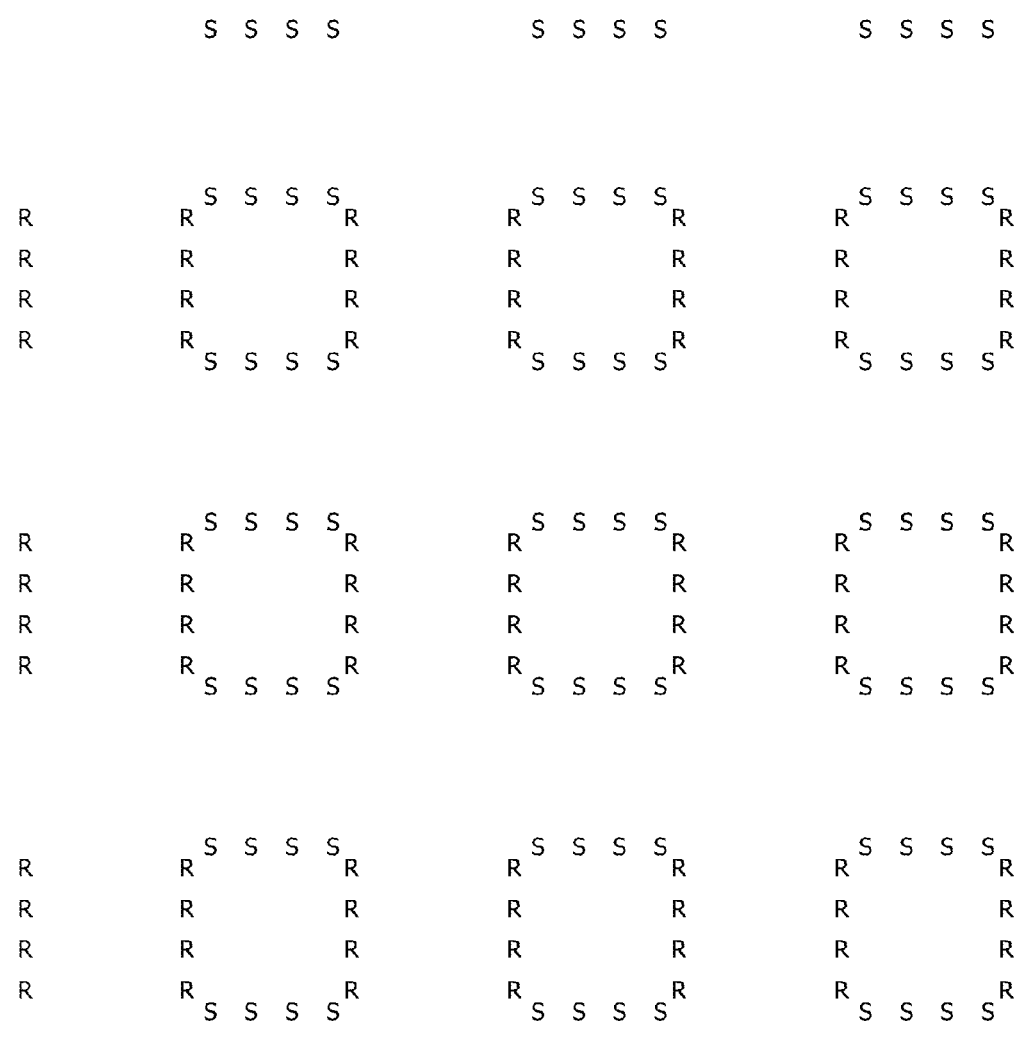
Figure 7:
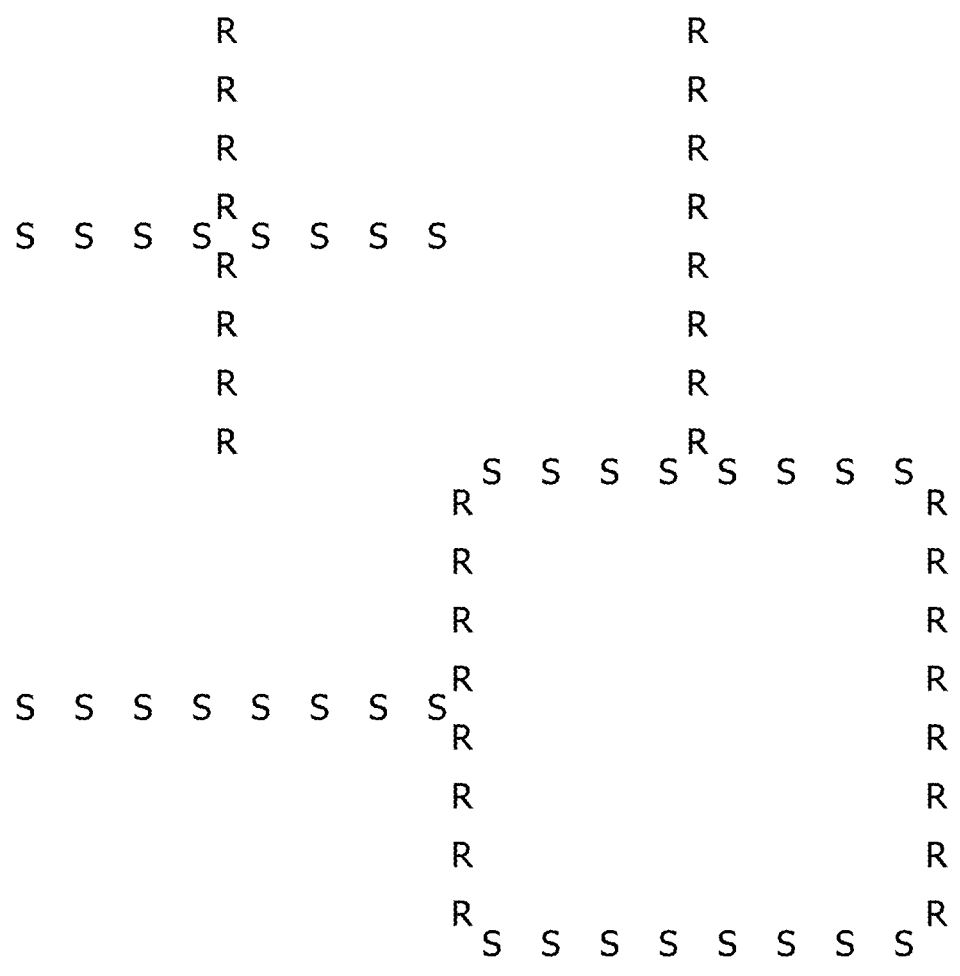
Figure 7A:
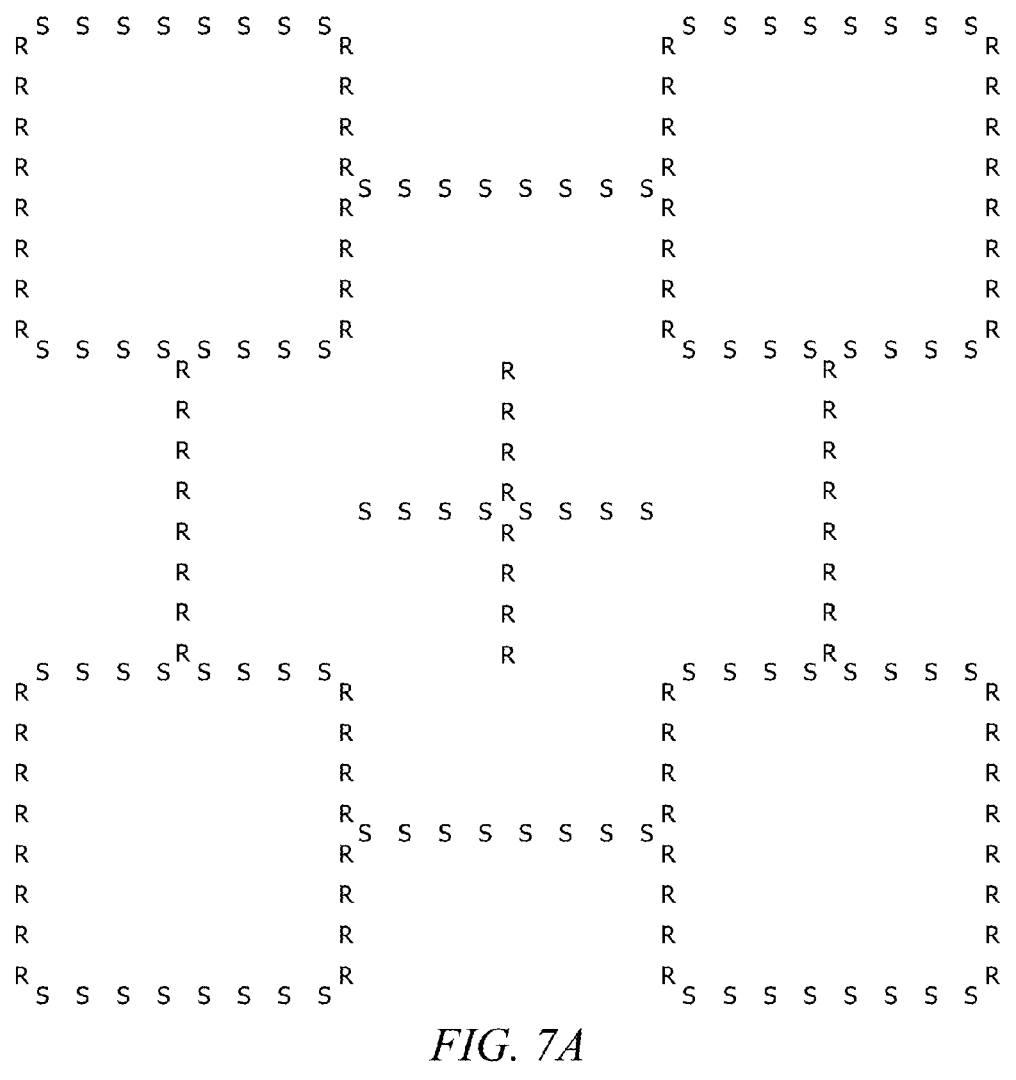
Figure 8:
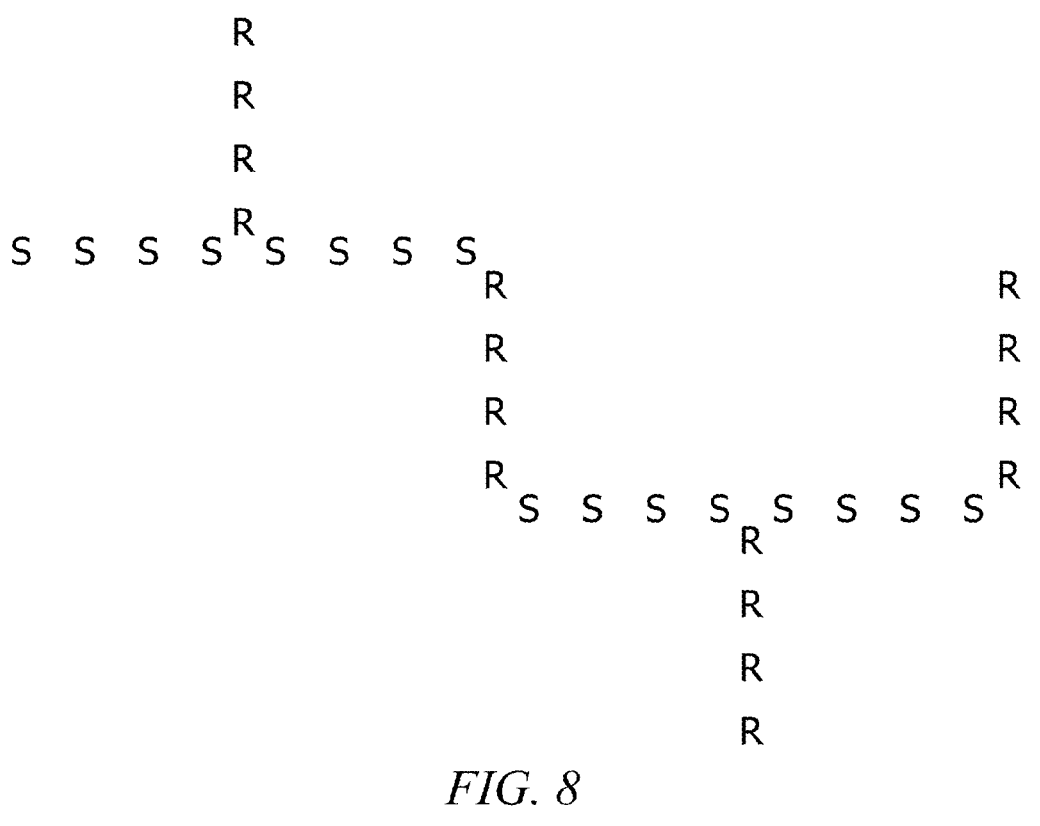
Figure 8A:
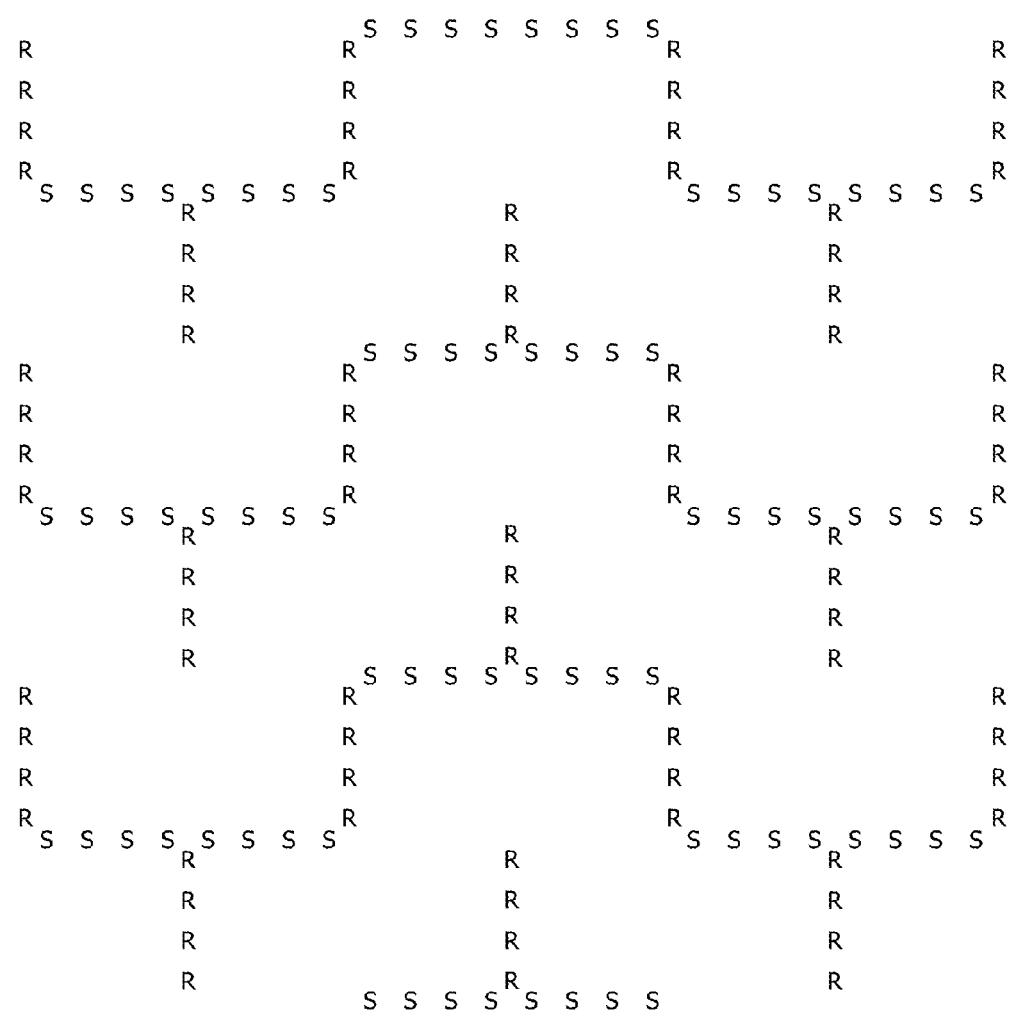
Figure 9:
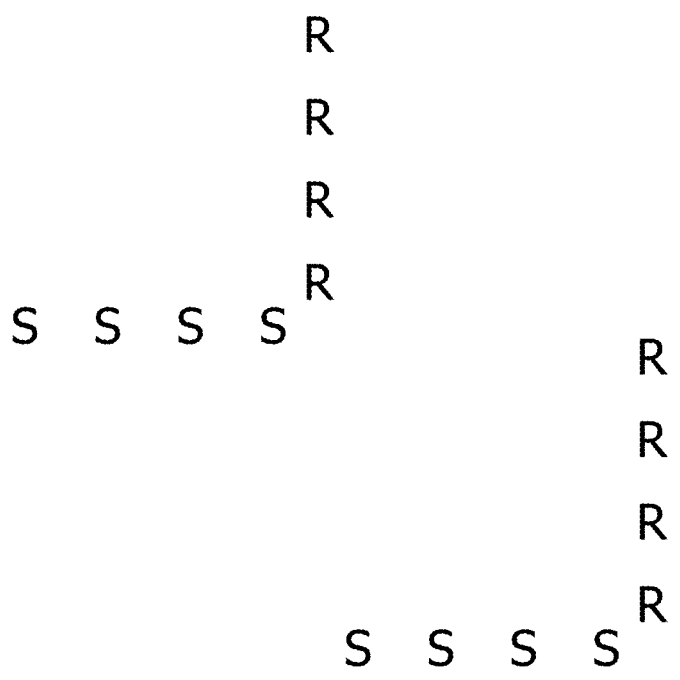
Figure 9A:
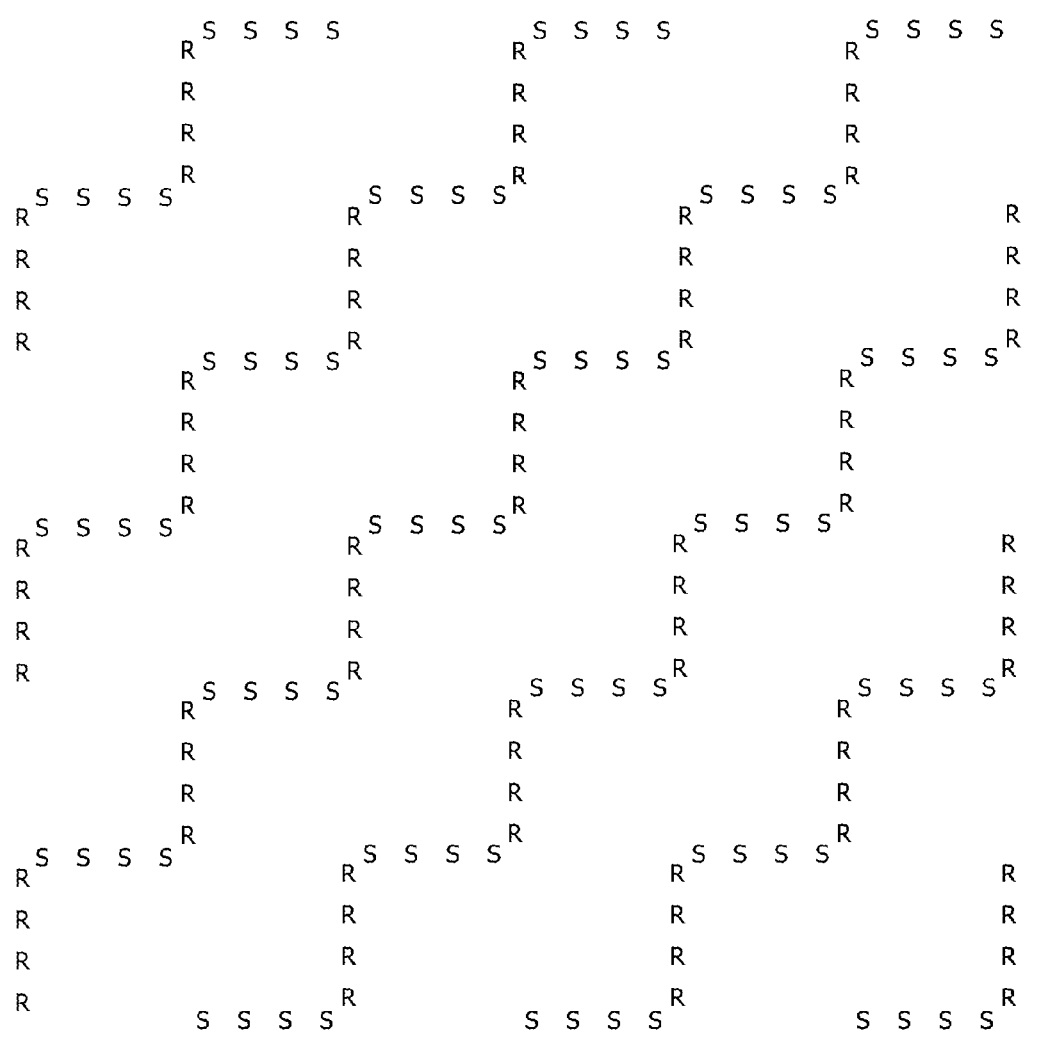
Figure 10A:
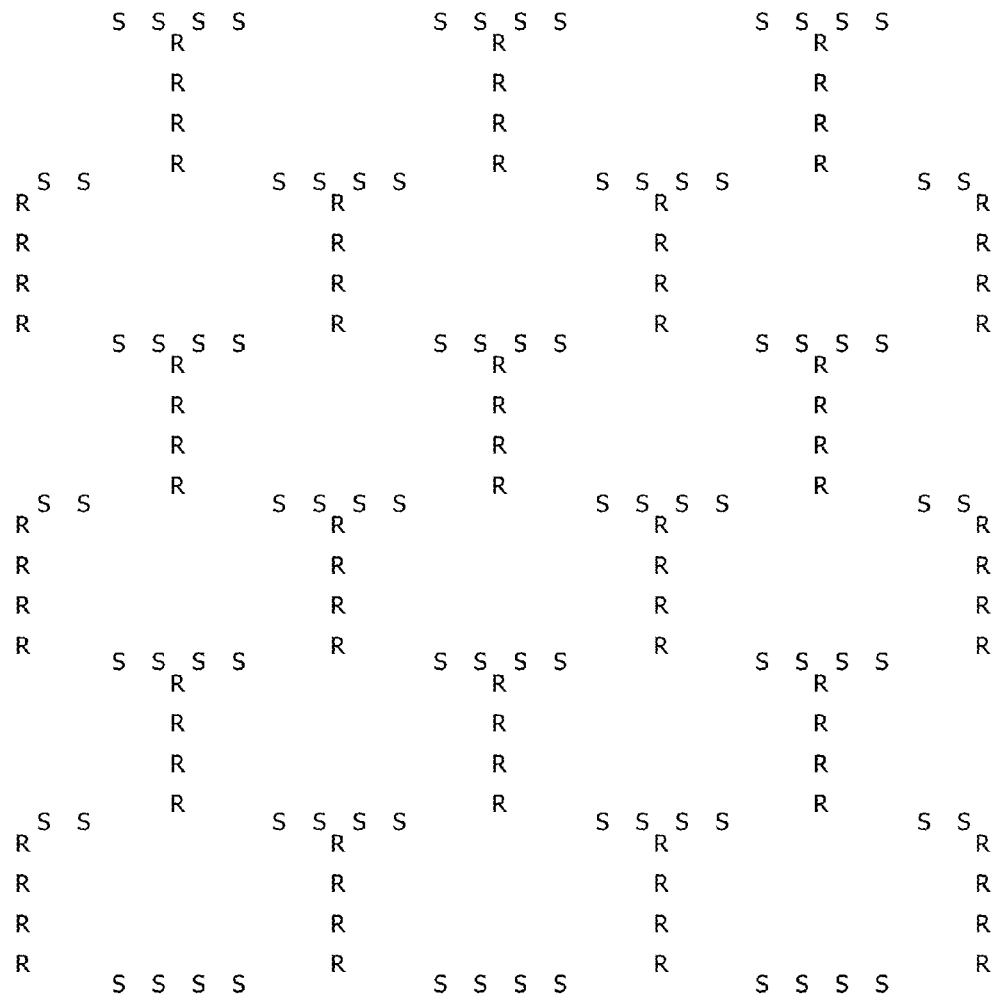
Figure 11:
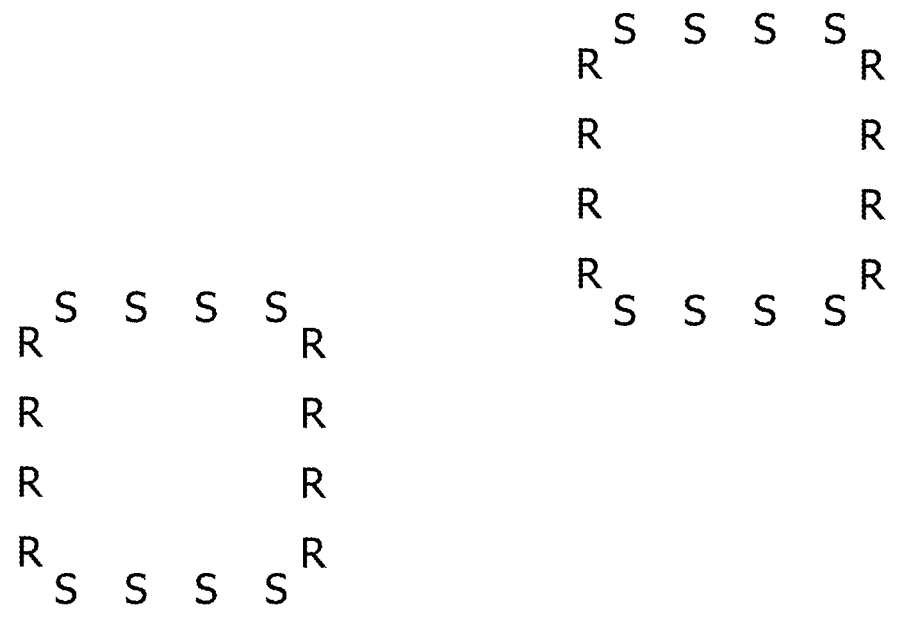
Figure 11A:
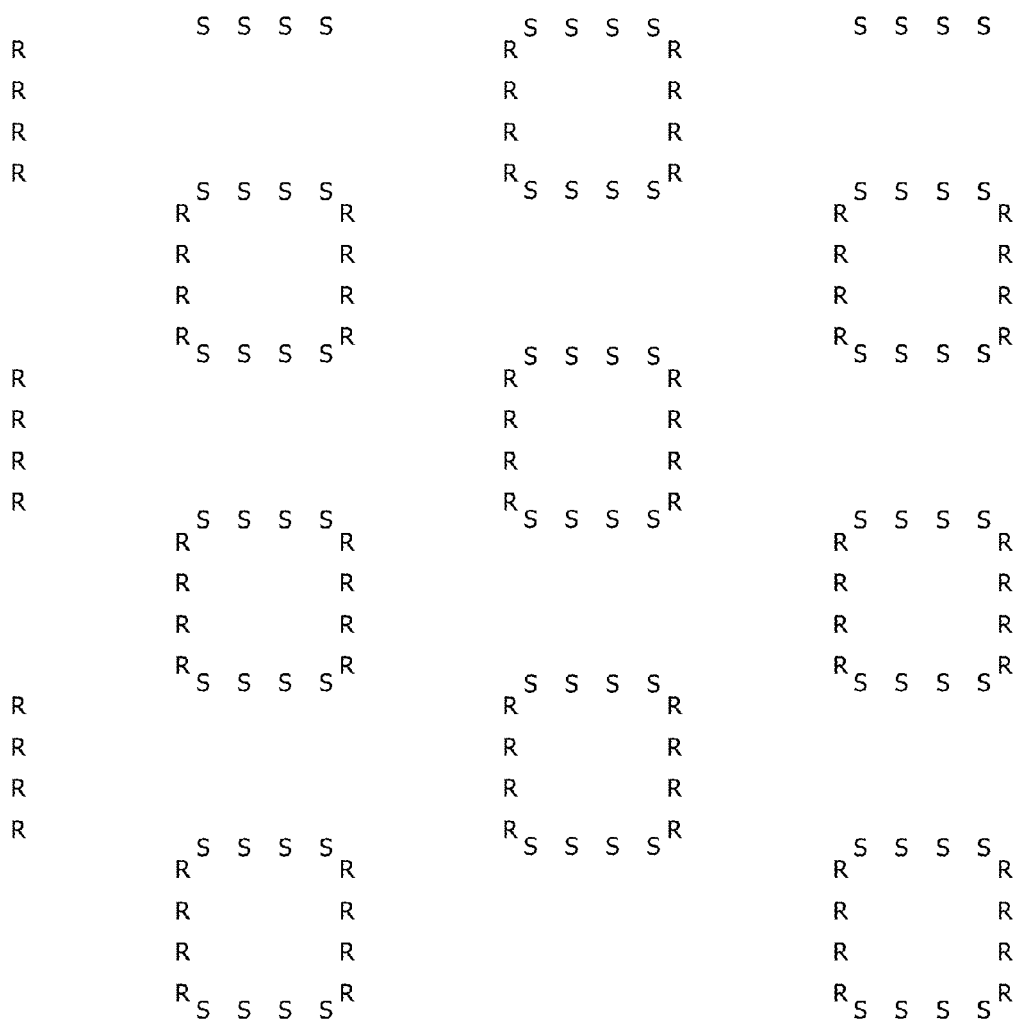
Figure 12:
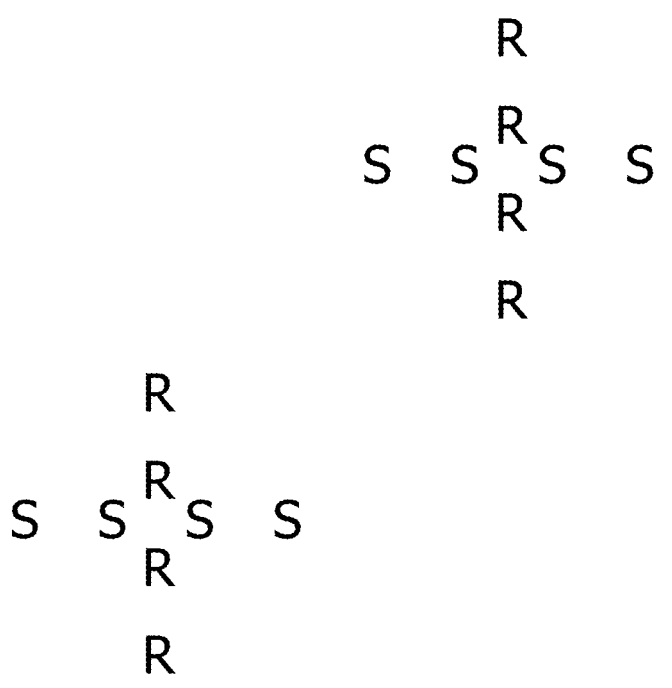
Figure 12A:
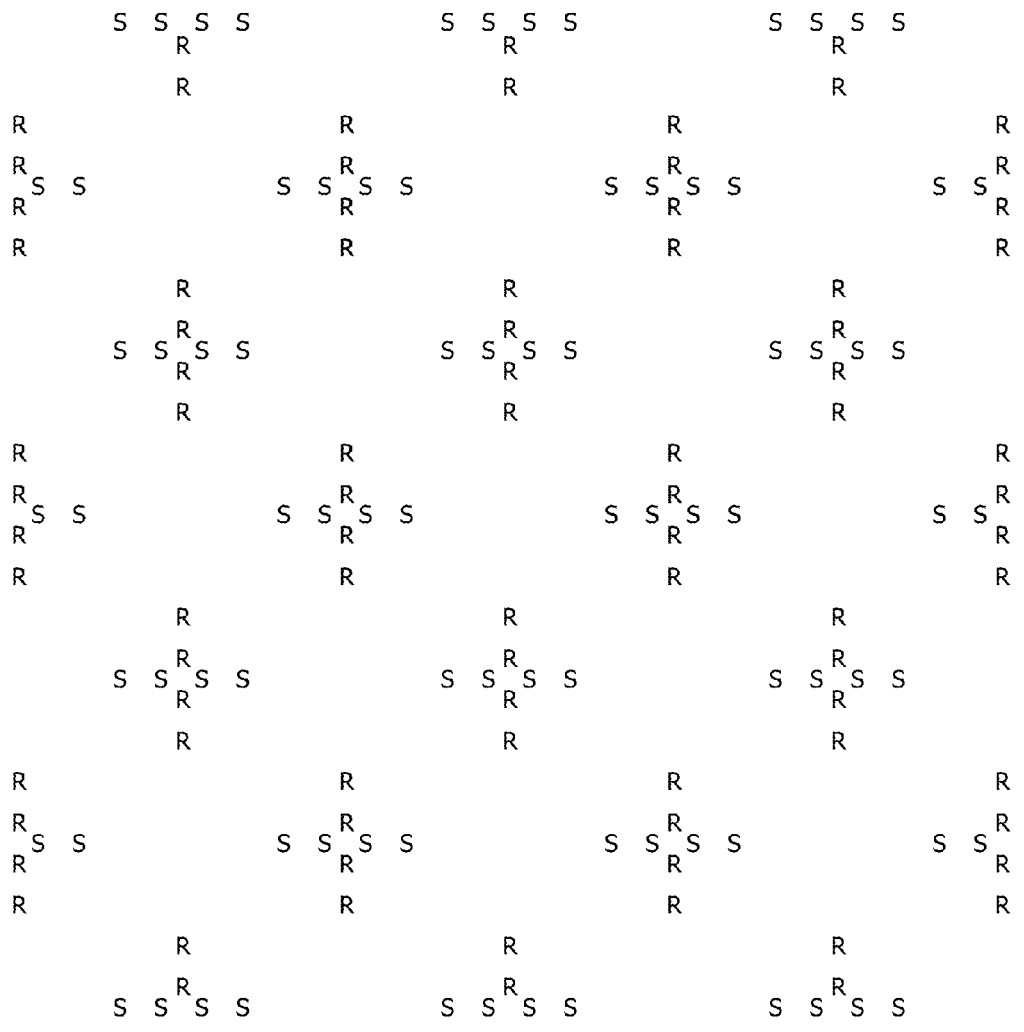
Figure 13:
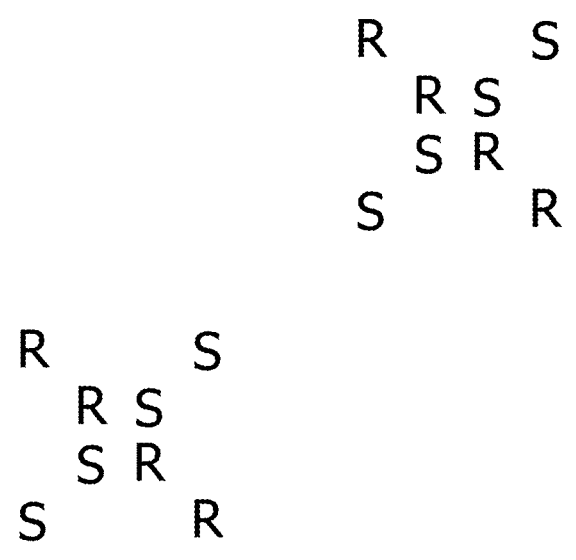
Figure 13A:
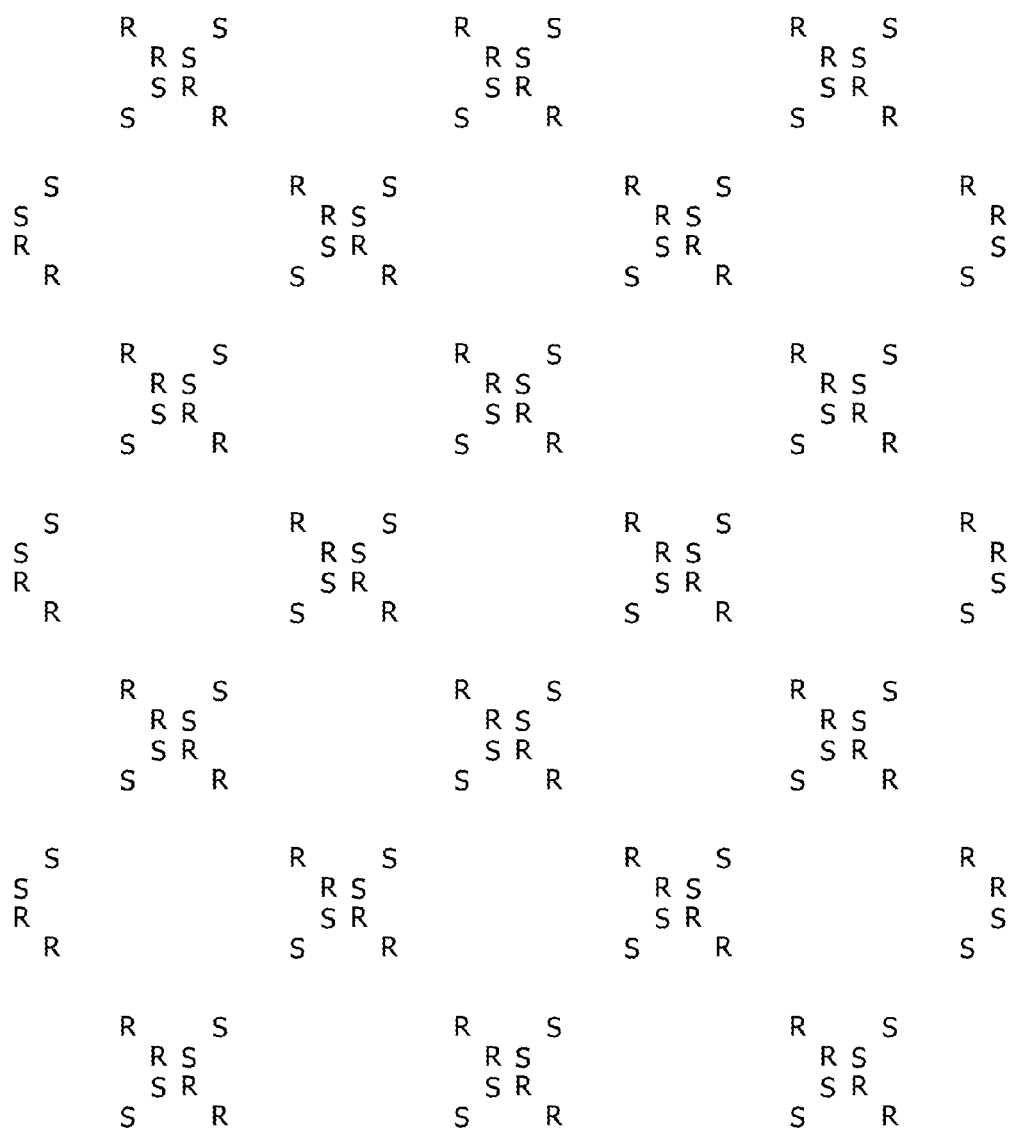

It should be appreciated that patterns other than "H plus I" and "I plus H" may be used in the collection and processing of seismic data according to embodiments of the present disclosure. FIG. 5 depicts a "square wave" source and receiver configuration according to an embodiment of the present disclosure, and FIG. 5A depicts a "square wave" source and receiver propagation configuration. FIG. 6 depicts a "symmetric square" source and receiver configuration according to an embodiment of the present disclosure, and FIG. 6A depicts a "symmetric square" source and receiver propagation configuration. FIG. 7 depicts a "box plus" source and receiver configuration according to an embodiment of the present disclosure, and FIG. 7A depicts a "box plus" source and receiver propagation configuration. FIG. 8 depicts a "goal tee" source and receiver configuration according to an embodiment of the present disclosure, and FIG. 8A depicts a "goal tee" source and receiver propagation configuration. FIG. 9 depicts a "step" source and receiver configuration according to an embodiment of the present disclosure, and FIG. 9A depicts a "step" source and receiver propagation configuration. FIG. 10 depicts a "Texas tee" source and receiver configuration according to an embodiment of the present disclosure, and FIG. 10A depicts a "Texas tee" source and receiver propagation configuration. FIG. 11 depicts an "offset squares" source and receiver configuration according to an embodiment of the present disclosure, and FIG. 11A depicts an "offset squares" source and receiver propagation configuration. FIG. 12 depicts an "offset cross" source and receiver configuration according to an embodiment of the present disclosure, and FIG. 12A depicts an "offset cross" source and receiver propagation configuration. FIG. 13 depicts an "offset x" source and receiver configuration according to an embodiment of the present disclosure, and FIG. 13A depicts an "offset x" source and receiver propagation configuration. The "offset x" is similar to "offset cross" except that the "plus" signs in the pattern may be substituted with "x"s.

It should be appreciated that with respect to the patterns or configurations depicted in FIGS. 1-13, sources may be substituted with receivers and vice versa in each of the patterns or configurations without departing from the present disclosure.

In addition, the patterns or configurations may be angled according to embodiments of the present disclosure.

In each of the patterns or configurations depicted in FIGS. 1-13, it should be appreciated that the numbers of sources or receivers may be modified depending on the topography or the size of the location where seismic data may be collected without departing from the present disclosure. Similarly, the spacing between sources and receivers within a pattern or configuration may be modified without departing from the present disclosure. Each of these modifications may be made in order to maximize the quality of the results of the final 3D seismic imaging plot. Each of the patterns also may provide better resolution on a fold plot and azimuth map than is possible with brick or ortho patterns that have been used in the past.

Figure 14:
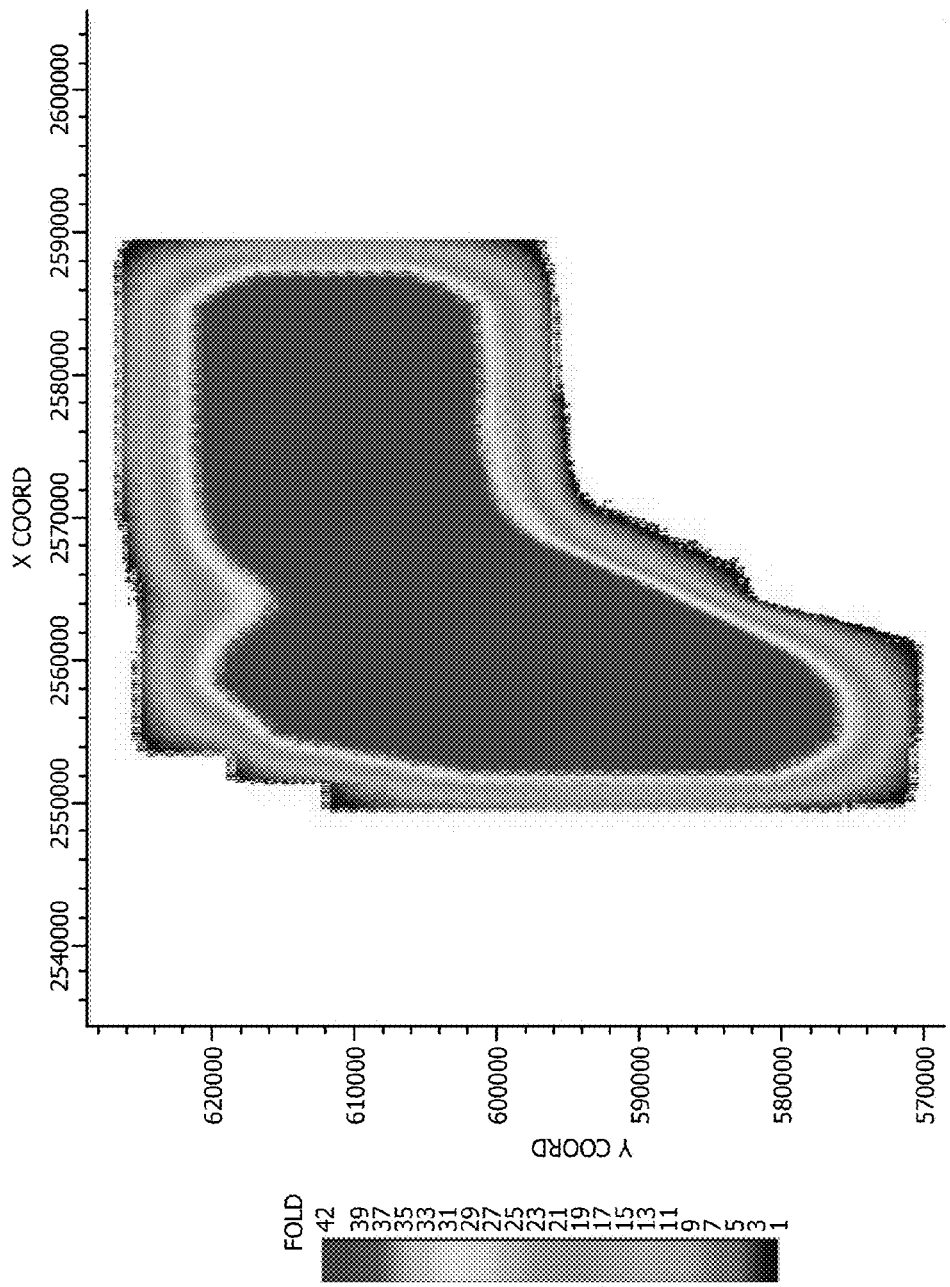
FIG. 14 depicts a seismic imaging plot formed from using an "I+H" configuration according to an embodiment of the present disclosure.

For example, FIG. 14 depicts a 3D seismic image plot formed using an "I+H" pattern according to an embodiment of the present disclosure. This plot may reflect a seismic data collection project over a 60 square mile area. In contrast to the previous patterns used for placement of sources and receivers (FIG. 15), only approximately 3690 dynamic shots may be needed to form the plot of FIG. 14 as compared to over 6000 that may typically be used for such a seismic data collection project. This may provide a tremendous cost savings insofar as each shot may typically come at a cost of approximately $500. By reducing the number of shots by approximately 3000 for a 60 square mile area, savings of approximately $1.5 million may be achieved on a single project. As the size of the land increases, further cost savings may be achieved. In addition, a comparison of the plots depicted in FIGS. 14 and 15 may demonstrate that the imaging plot formed using the "I+H" pattern according to embodiments of the present disclosure may provide better accuracy and as much as 4 times improvement in resolution with a reduced number of shots and at a lower cost.

Use of patterns such as "I+H" according to embodiments of the present disclosure may result in more accuracy in the seismic data recordings made and the resulting imaging plots. FIG. 14 includes a substantial amount of red, and this indicates a greater fold when a pattern such as "I+H" may be employed according to embodiments of the present disclosure. In contrast, FIG. 15 includes much less red, and accordingly, less fold, than the pattern depicted in FIG. 14. Further, if the pattern is tighter (i.e., the blocks are smaller), more improvement in the fold may occur, and this also is illustrated through a comparison of FIG. 14 to FIG. 15.

Figure 15:
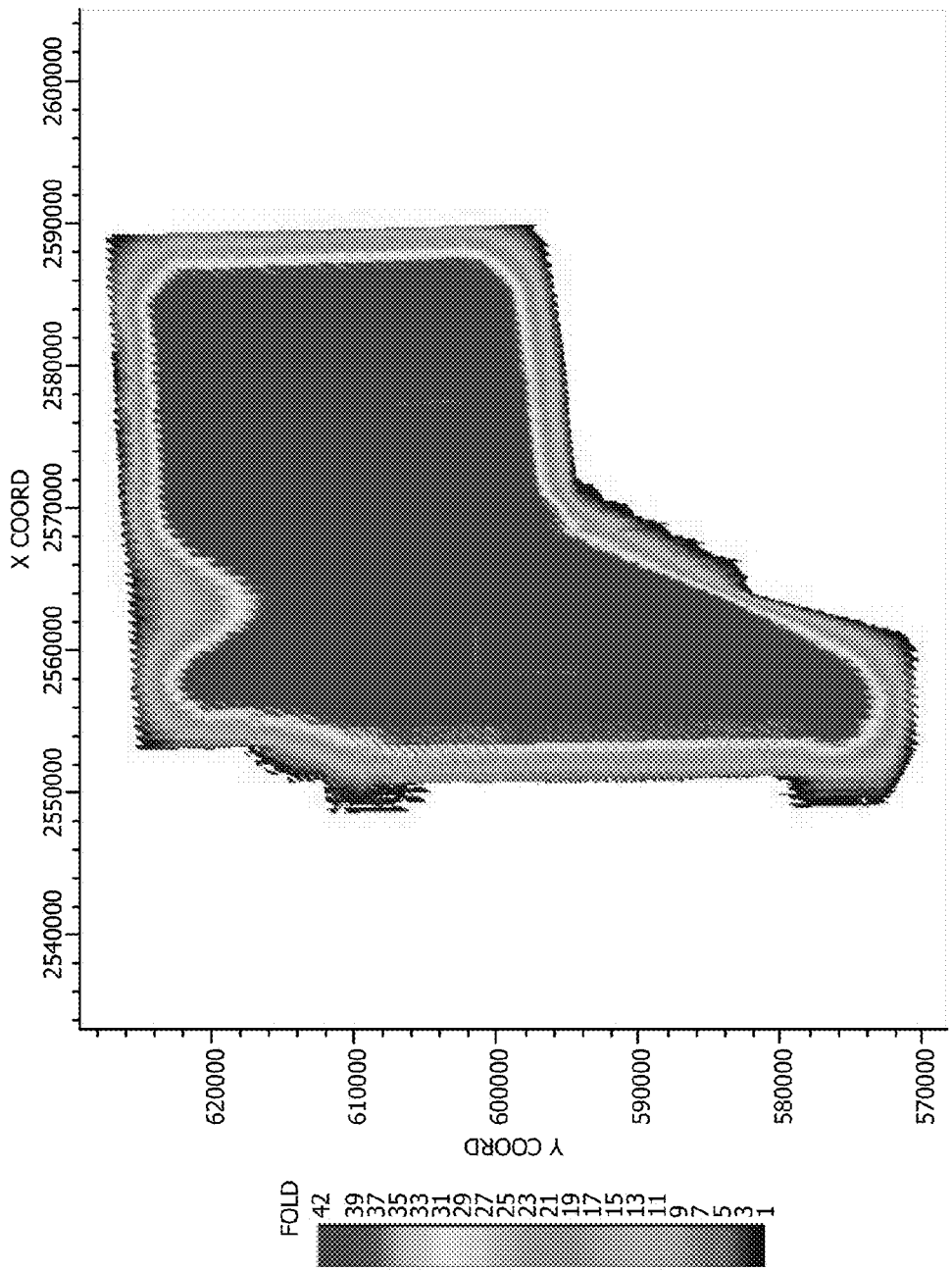
FIG. 15 depicts a prior art seismic imaging plot.
Figure 16:
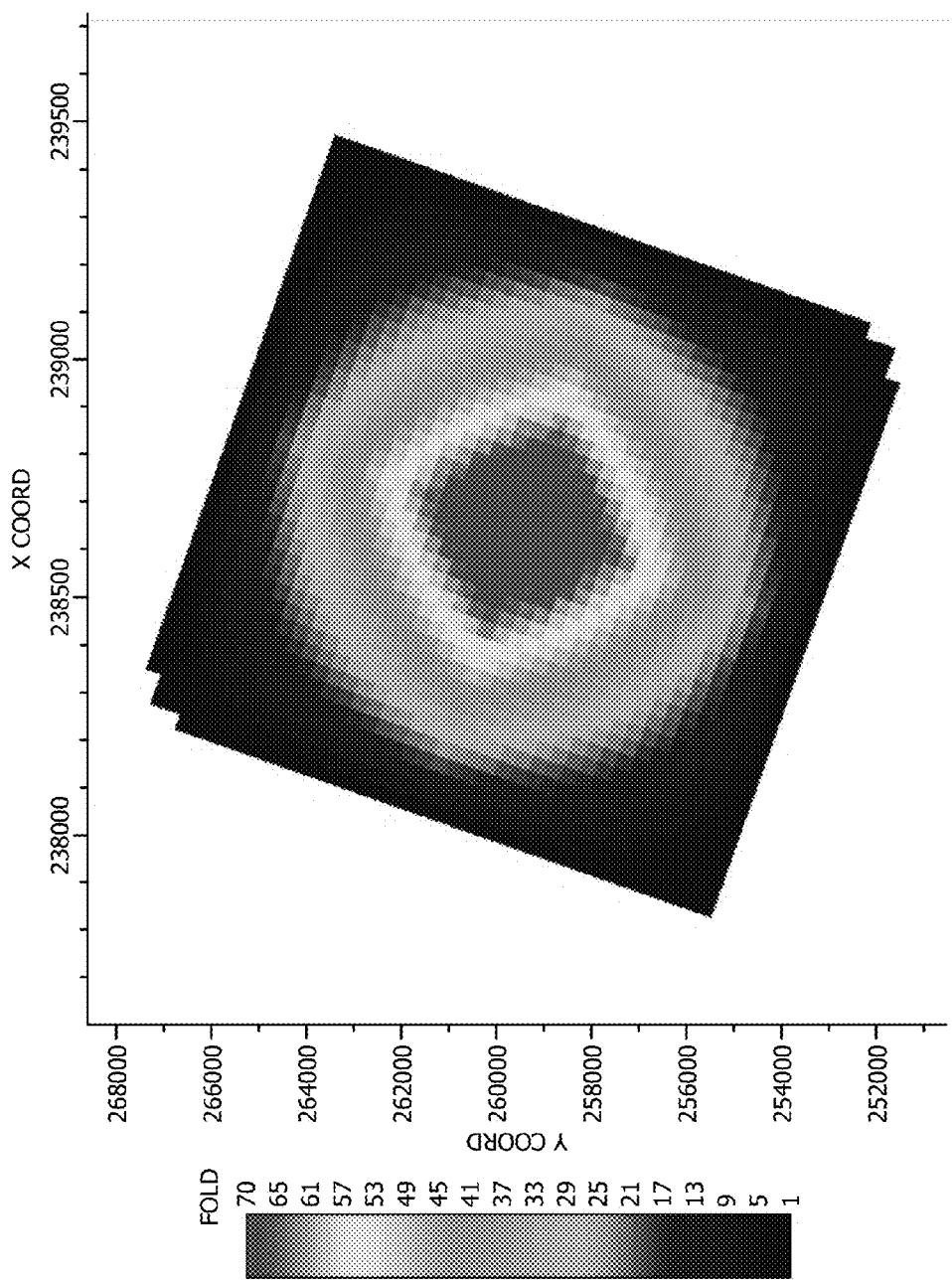
FIG. 16 depicts a seismic imaging plot formed from using a "box plus" configuration according to an embodiment of the present disclosure.
Figure 16A:
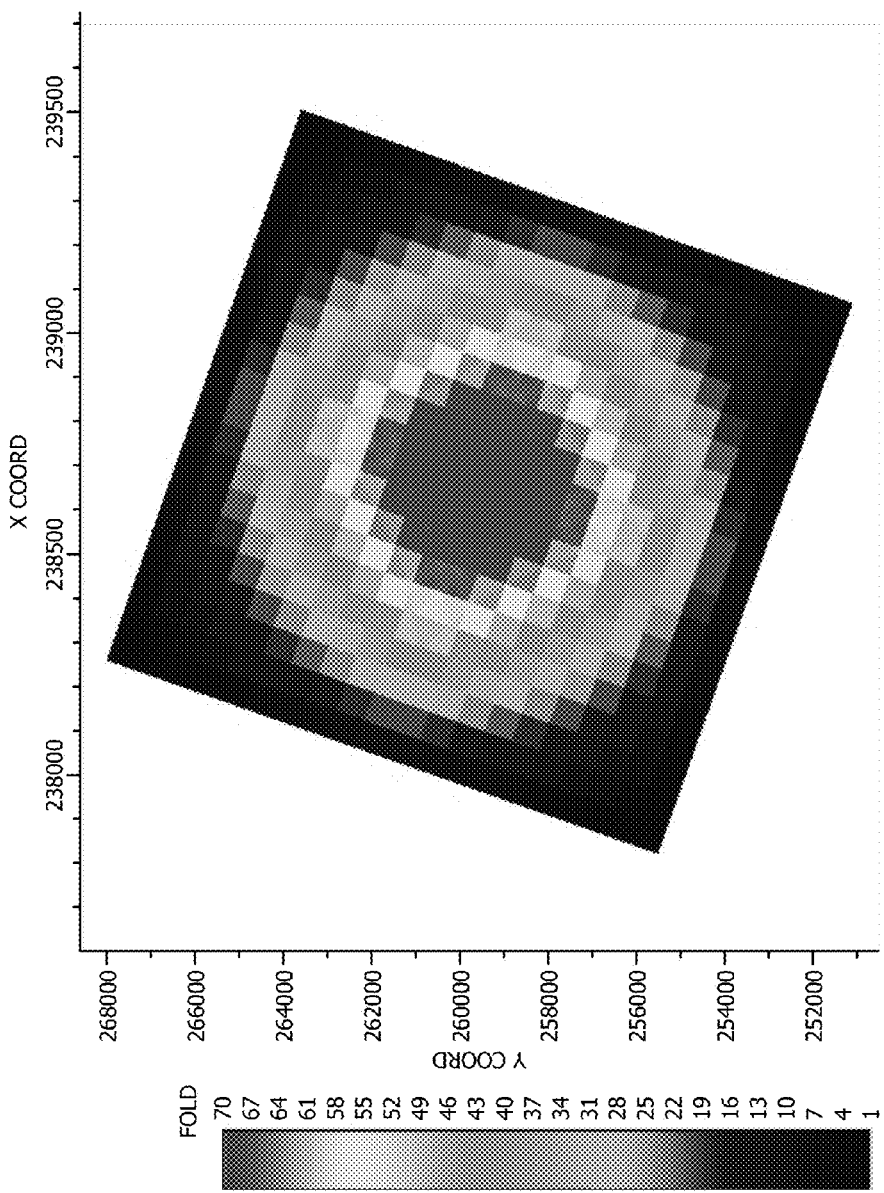
FIG. 16A depicts a prior art seismic imaging plot.
Figure 16B:
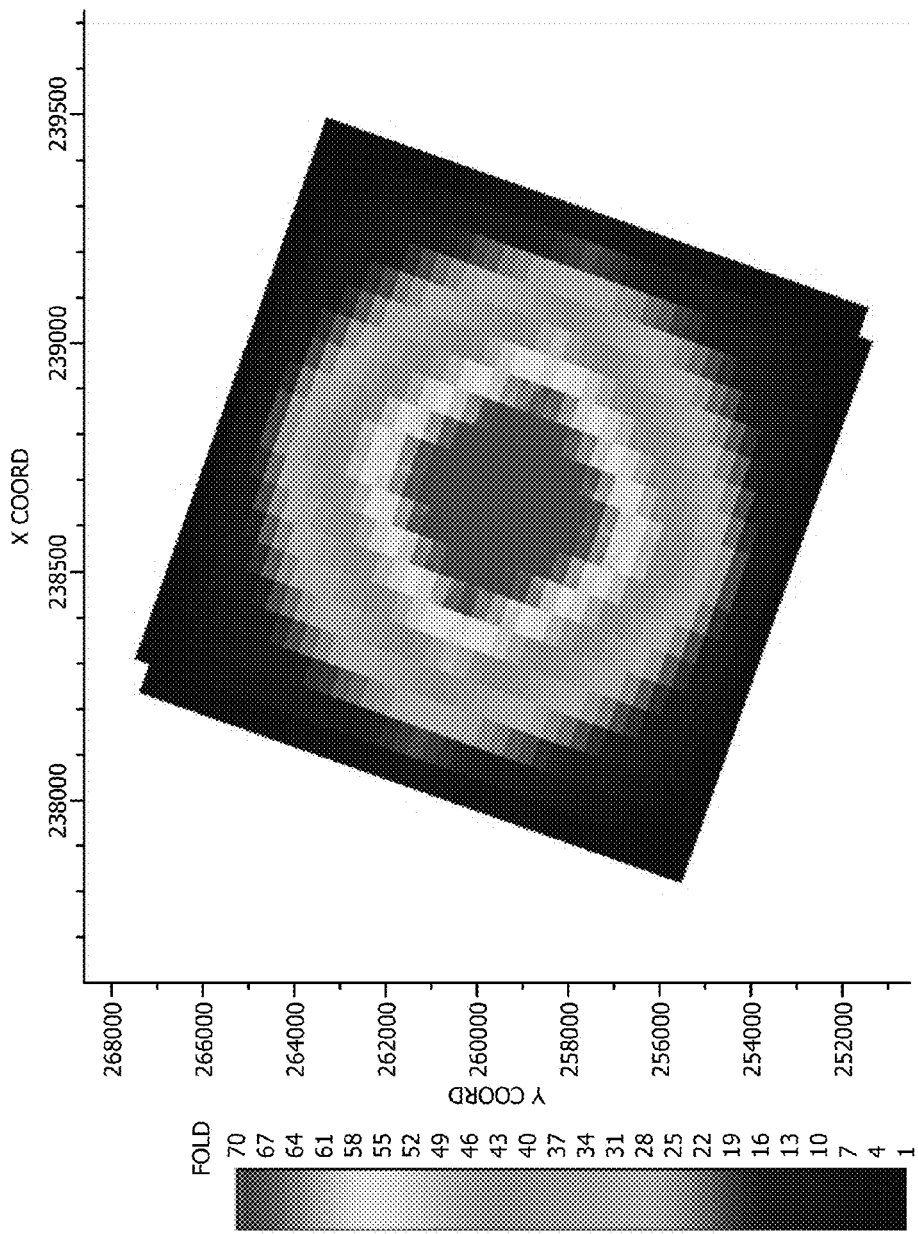
FIG. 16B depicts a prior art seismic imaging plot.

Similar to the plot improvements depicted in FIG. 14 as compared to FIG. 15, FIG. 16 depicts a 3D seismic imaging plot formed using a "box plus" pattern according to an embodiment of the present disclosure. The plot depicted in FIG. 16 may utilize 800 sources and 800 receivers to form the "box plus" pattern. In contrast, more sources (880) and receivers (880) are needed to cover the same amount of land with an ortho pattern (FIG. 16A) and more receivers (880) are needed to cover the same amount of land with a brick pattern (FIG. 16B). Accordingly, there may be a cost reduction in utilizing a "box plus" pattern as compared to ortho or brick patterns that have been used in the past insofar as fewer sources and receivers may be utilized at a lower cost per shot. In addition, the resolution achieved by using a "box plus" pattern (FIG. 16) may be improved as compared to that previously achieved with an ortho pattern (FIG. 16A) or brick pattern (FIG. 16B). While FIG. 16 depicts improvements in seismic imaging plots using a "box plus" pattern, it should be appreciated that other patterns described according to embodiments of the present disclosure may provide similar improvements in resolution as well as cost savings when compared to the previously used ortho and brick patterns.

It should be appreciated that there may be some places on the land where sources and/or receivers may not be placed, such as ponds, houses, and cliffs. In such instances, the sources and/or receivers may be "offset" and this may lead to some degradation in the resulting imaging plot of the seismic data. While such offsetting may occur in embodiments of the present disclosure, less degradation tends to result due to the positioning of the sources and receivers relative to each other. Further, in some embodiments of the present disclosure, shots may be run at an angle to sources and/or shots may be rotated relative to the source in order to further reduce the number of shots that may be needed to collect seismic data and form an imaging plot. By varying spacing or angles between the sources and receivers in patterns according to embodiments of the present disclosure, the data may be collected to produce better resolution in a seismic imaging plot at a lower cost. Similarly, as fewer sources and receivers may be needed, safety concerns also may be addressed along with providing improved resolution and cost savings. Patterns according to embodiments of the present disclosure also may provide for sources and receivers to be positioned in patterns other than straight lines. By using these patterns according to embodiments of the present disclosure, high resolution in the seismic acquisition footprint exclusion process may be achieved at a low cost.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A seismic information gathering system, the system comprising:
   an alternating source pattern, wherein a plurality of source locations are set parallel to each other separated by one unit to create two straight-line segments; and
   an alternating receiver pattern, wherein a plurality of receiver locations are set parallel to each other and perpendicular to the plurality of source locations separated by one unit,
   wherein the alternating source pattern and the alternating receiver pattern form a base pattern including at least an "H," an "I" and a "+."

2. The seismic information gathering system of claim 1, wherein the base pattern is an "H+I" pattern.

3. The seismic information gathering system of claim 1, wherein the base pattern is an "I+H" pattern.

4. The seismic information gathering system of claim 1, wherein the base pattern is rotated at an angle between 0 and 360 degrees with reference to the earth.

5. The seismic information gathering system of claim 1, wherein the base pattern is repeated at a predefined interval.

6. The seismic information gathering system of claim 1, wherein the system is in a closed configuration.

7. The seismic information gathering system of claim 1, wherein the system is in an open configuration.

8. The seismic information gathering system of claim 1, wherein the alternating source pattern is positioned at an angle relative to the alternating receiver pattern.

9. A seismic information gathering system, the system comprising:
- an alternating receiver pattern, wherein a plurality of receiver locations are set parallel to each other separated by one unit to create two straight-line segments; and
- an alternating source pattern, wherein a plurality of source locations are set parallel to each other and perpendicular to the plurality of receiver locations separated by one unit,
- wherein the alternating source pattern and the alternating receiver pattern form a base pattern including at least an "H," an "I" and a "+."

10. The seismic information gathering system of claim 9, wherein the base pattern is an "H+I" pattern.

11. The seismic information gathering system of claim 9, wherein the base pattern is an "I+H" pattern.

12. The seismic information gathering system of claim 9, wherein the base pattern is rotated at an angle between 0 and 360 degrees with reference to the earth.

13. The seismic information gathering system of claim 9, wherein the system is in a closed configuration.

14. The seismic information gathering system of claim 9, wherein the alternating source pattern is positioned at an angle relative to the alternating receiver pattern.

15. A seismic information gathering system, the system comprising:
- an alternating receiver pattern, wherein a plurality of receiver locations are set parallel to each other separated by one unit to create two straight-line segments; and
- an alternating source pattern, wherein a plurality of source locations are set parallel to each other and perpendicular to the plurality of receiver locations separated by one unit,
- wherein the alternating source pattern and the alternating receiver pattern form a base pattern including a "box" and a "+."

16. The seismic information gathering system of claim 15, wherein the base pattern is rotated at an angle between 0 and 360 degrees with reference to the earth.

17. The seismic information gathering system of claim 15, wherein the alternating source pattern is positioned at an angle relative to the alternating receiver pattern.

18. The seismic information gathering system of claim 15, wherein the base pattern is repeated at a predefined interval.

19. The seismic information gathering system of claim 15, wherein the system is in a closed configuration.

20. The seismic information gathering system of claim 15, wherein the alternating receiver pattern and the alternating source pattern are inverted.

* * * * *